US007543096B2

(12) United States Patent
Davies

(10) Patent No.: US 7,543,096 B2
(45) Date of Patent: Jun. 2, 2009

(54) SAFE MESSAGE TRANSFERS ON PCI-EXPRESS LINK FROM RAID CONTROLLER TO RECEIVER-PROGRAMMABLE WINDOW OF PARTNER RAID CONTROLLER CPU MEMORY

(75) Inventor: Ian Robert Davies, Longmont, CO (US)

(73) Assignee: Dot Hill Systems Corporation, Carlsbad, CA (US)

( * ) Notice: Subject to any disclaimer, the term of this patent is extended or adjusted under 35 U.S.C. 154(b) by 407 days.

(21) Appl. No.: 11/329,470

(22) Filed: Jan. 5, 2006

(65) Prior Publication Data

US 2006/0161709 A1    Jul. 20, 2006

Related U.S. Application Data

(63) Continuation-in-part of application No. 11/178,727, filed on Jul. 11, 2005, now Pat. No. 7,315,911.

(60) Provisional application No. 60/645,340, filed on Jan. 20, 2005, provisional application No. 60/694,442, filed on Jun. 27, 2005.

(51) Int. Cl.
*G06F 13/24* (2006.01)
(52) U.S. Cl. .......................... 710/268; 709/216; 714/5; 714/6; 714/7; 714/8
(58) Field of Classification Search ................ 709/216; 710/268; 714/5–8
See application file for complete search history.

(56) References Cited

U.S. PATENT DOCUMENTS 4,217,486 A    8/1980    Tawfik et al.

(Continued)

FOREIGN PATENT DOCUMENTS

EP    0800138 A    10/1997

(Continued)

OTHER PUBLICATIONS

PCI-SIG. PCI Express Base Specification Revision 1.0a. Apr. 15, 2003.*

(Continued)

*Primary Examiner*—Mark Rinehart
*Assistant Examiner*—Matthew D Spittle
(74) *Attorney, Agent, or Firm*—E. Alan Davis; James W. Huffman

(57) ABSTRACT

A fault-tolerant mass storage system includes two RAID controllers that communicate via a PCI-Express link. Each controller has a bus bridge coupled to the link, a cache memory that caches user data for storage on disk drives controlled by the controllers, and a CPU. The CPU fetches and executes program instructions from a CPU memory coupled to it. The CPU programs the bus bridge with window information defining a window of locations within the CPU memory, which is less than an entirety of the CPU memory. The bus bridge receives data on the link from the other controller and if the header of a packet containing the data indicates it is destined for the CPU memory, the bus bridge translates the address of the data so as to write the data safely to the CPU memory, but only within the window and nowhere else within the CPU memory.

64 Claims, 11 Drawing Sheets

U.S. PATENT DOCUMENTS

| | | | | |
|---|---|---|---|---|
| 4,251,869 A | * | 2/1981 | Shaffer | 702/78 |
| 4,428,044 A | | 1/1984 | Liron | |
| 5,345,565 A | | 9/1994 | Jibbe et al. | |
| 5,408,644 A | | 4/1995 | Schneider et al. | |
| 5,483,528 A | | 1/1996 | Christensen | |
| 5,530,842 A | | 6/1996 | Abraham et al. | |
| 5,553,023 A | * | 9/1996 | Lau et al. | 365/189.14 |
| 5,613,068 A | * | 3/1997 | Gregg et al. | 709/216 |
| 5,619,642 A | | 4/1997 | Nielson et al. | |
| 5,619,644 A | | 4/1997 | Crockett et al. | |
| 5,668,956 A | | 9/1997 | Okazawa et al. | |
| 5,680,579 A | | 10/1997 | Young et al. | |
| 5,706,283 A | | 1/1998 | Suzuki | |
| 5,754,884 A | * | 5/1998 | Swanstrom | 710/22 |
| 5,802,602 A | * | 9/1998 | Rahman et al. | 711/204 |
| 5,812,754 A | | 9/1998 | Lui et al. | |
| 5,881,254 A | | 3/1999 | Corrigan et al. | |
| 6,009,275 A | | 12/1999 | DeKoning et al. | |
| 6,038,680 A | | 3/2000 | Olarig | |
| 6,058,455 A | | 5/2000 | Islam et al. | |
| 6,094,699 A | | 7/2000 | Surugucchi et al. | |
| 6,098,140 A | | 8/2000 | Pecone et al. | |
| 6,185,652 B1 | | 2/2001 | Shek et al. | |
| 6,223,252 B1 | | 4/2001 | Bandera et al. | |
| 6,243,829 B1 | | 6/2001 | Chan | |
| 6,272,533 B1 | | 8/2001 | Browne | |
| 6,397,293 B2 | | 5/2002 | Shrader et al. | |
| 6,421,769 B1 | | 7/2002 | Teitenberg et al. | |
| 6,438,603 B1 | | 8/2002 | Ogus | |
| 6,470,429 B1 | | 10/2002 | Jones et al. | |
| 6,493,795 B1 | | 12/2002 | Arsenault et al. | |
| 6,502,157 B1 | | 12/2002 | Batchelor et al. | |
| 6,507,581 B1 | | 1/2003 | Sgammato | |
| 6,629,179 B1 | | 9/2003 | Bashford | |
| 6,718,408 B2 | | 4/2004 | Esterberg et al. | |
| 6,732,243 B2 | * | 5/2004 | Busser et al. | 711/162 |
| 6,839,788 B2 | | 1/2005 | Pecone | |
| 6,912,621 B2 | | 6/2005 | Harris | |
| 6,944,617 B2 | | 9/2005 | Harriman | |
| 7,046,668 B2 | * | 5/2006 | Pettey et al. | 370/392 |
| 7,069,368 B2 | | 6/2006 | Thornton | |
| 7,071,946 B2 | * | 7/2006 | Jeddeloh | 345/532 |
| 7,107,343 B2 | | 9/2006 | Rinaldis et al. | |
| 7,149,819 B2 | | 12/2006 | Pettey | |
| 7,457,902 B2 | | 11/2008 | Yang et al. | |
| 2001/0013076 A1 | | 8/2001 | Yamamoto | |
| 2002/0029319 A1 | | 3/2002 | Robbins et al. | |
| 2002/0069317 A1 | | 6/2002 | Chow et al. | |
| 2002/0069334 A1 | | 6/2002 | Hsia et al. | |
| 2002/0083111 A1 | | 6/2002 | Row et al. | |
| 2002/0091828 A1 | | 7/2002 | Kitamura et al. | |
| 2002/0099881 A1 | | 7/2002 | Gugel | |
| 2002/0194412 A1 | | 12/2002 | Bottom | |
| 2003/0065733 A1 | | 4/2003 | Pecone | |
| 2003/0065836 A1 | | 4/2003 | Pecone | |
| 2003/0217211 A1 | * | 11/2003 | Rust et al. | 710/305 |
| 2004/0064638 A1 | | 4/2004 | Chong, Jr. | |
| 2004/0177126 A1 | | 9/2004 | Maine | |
| 2004/0221198 A1 | | 11/2004 | Vecoven | |
| 2005/0044169 A1 | | 2/2005 | Arbeitman et al. | |
| 2005/0102549 A1 | | 5/2005 | Davies et al. | |
| 2005/0102557 A1 | | 5/2005 | Davies et al. | |
| 2006/0106982 A1 | | 5/2006 | Ashmore et al. | |
| 2006/0161707 A1 | | 7/2006 | Davies et al. | |
| 2006/0230218 A1 | | 10/2006 | Warren et al. | |
| 2006/0242312 A1 | | 10/2006 | Crespi et al. | |
| 2006/0248308 A1 | | 11/2006 | Wang et al. | |
| 2006/0248400 A1 | | 11/2006 | Miyamoto | |
| 2006/0277347 A1 | | 12/2006 | Ashmore et al. | |
| 2006/0282701 A1 | | 12/2006 | Davies et al. | |
| 2008/0005410 A1 | | 1/2008 | Mies et al. | |
| 2008/0005470 A1 | | 1/2008 | Davies | |
| 2008/0201616 A1 | | 8/2008 | Ashmore | |

FOREIGN PATENT DOCUMENTS

| | | |
|---|---|---|
| EP | 0817054 | 1/1998 |
| EP | 0967552 | 12/1999 |
| GB | 2396726 A | 6/2004 |
| JP | 2001142648 | 5/2001 |
| WO | WO0182077 | 11/2001 |
| WO | WO2006124217 | 11/2006 |
| WO | WO2007002219 | 1/2007 |

OTHER PUBLICATIONS

Makijarvi, Petri. PICMG1.3 SHB Raid Performance. Evaluating next generation high-performance PC 4U computers. Jul. 4, 2007.*

Luse, Paul. The Benefits of RAID on Motherboard. May 2003.*

Overland Storage. Tiered Data Protection Made Simple. 2008.*

Budruk et al. "PCI Express System Architecture." Addison Wesley Professional. Sep. 4, 2003.

"DCM PCI-X Verification Services" Datasheet #1. DCM Technologies, 39675 Cedar Blvd., #220, Newark, CA 94560.

"PCI-X Synthesizable Core." inSilicon Corporation. San Jose, CA. 1999.

"IBM 133 PCI-X Bridge" Datasheet. Apr. 6, 2001.

"IBM 133 PCI-X Bridge" Datasheet 2000. IBM Microelectronics Division.

"Tsi320™ Software Initialization Application Note." Oct. 2001. 80A600B_AN002_01. Tundra Semiconductor Corporation.

"PCI-X Bus Test Environment." 1999. inSilicon Corporation 411 East Plumeria Dr. San Jose, CA 95134.

"1005 IDT Precise PCI-Express Family Presentation." Integrated Device Technology.

"COMPAQ Rapid Enabler for PCI-X (CREX) Initiator Interface." (Preliminary). Revision 0.28 Sep. 2, 1999.

"COMPAQ Rapid Enabler for PCI-X (CREX) Target Bus Interface." (Preliminary). Revision 0.36 Sep. 2, 1999.

"Intel 41210 Serial to Parallel PCI Bridge Product Brief." Intel Corporation. 2003.

Pericom. "Bridge Products Road Map." Customer Presentation. pp. 31, 33-35.

IDT. "24-lane 3-Port PCI Express Switch" Product Brief. 89PES24N3. Dec. 22, 2005. Integrated Device Technology, Inc.

"PEX 8104" Data Book. Version 0.61. Mar. 2004. PLX Technology, Inc.

"PEX 8114 PCI Express to PCI/PCI-X Bridge." Product Brief. Version 2.0. 2004. PLX Technology, Inc.

"Tsi320™ PCI/X-to-PCI/X Bus Bridge Manual." Jan. 2001. 80A600B_MA001_02. Tundra Semiconductor Corporation.

"Tsi320™ Dual-Mode PCI-to-PCI Bus Bridge Errata." Sep. 2001. 80A600B_ER001_05. Tundra Semiconductor Corporation.

"Tsi320™ Dual-Mode PCI-to-PCI Bus Bridge User Manual." Jun. 2001. 80A600B_MA001_04. Tundra Semiconductor Corporation.

"Corex-V10 PCI-X Initiator/Target" Datasheet #1. DCM Technologies, 39675 Cedar Blvd., #220, Newark, CA 94560.

"X-caliber Design Specification: PCI-2.2/PCI-X Megacell" Rev 0.99.3. Nov. 19, 1999.

Young et al. *A high I/O reconfigurable crossbar switch*. 11th Annual IEEE Symposium on Field-Programmable Custom Computing Machines, 2003. FCCM 2003. Apr. 9-11, 2003. pp. 3-10.

Landman et al. *Activity-sensitive architectural power analysis*. IEEE Transactions in Computer-Aided Design of Integrated Circuits and Systems. Jun. 1966. pp. 571-587.

U.S. Office Action for U.S. Appl. No. 09/967,027, filed Apr. 30, 2004, pp. 1-7 and cover sheet.

U.S. Office Action for U.S. Appl. No. 09/967,126, filed Mar. 7, 2005, pp. 1-5 and cover sheet.

European Examination Report for Application No. GB0406742.7, dated Nov. 10, 2004.

European Examination Report for Application No. GB0406739.3, dated Nov. 10, 2004.

European Examination Report for Application No. GB0406740.1, dated Nov. 10, 2004.

DCM Presentation. DCM Technologies, 39675 Cedar Blvd. #220, Newark, CA 94560.

"PEX 8114: PCI-X-PCI Express Bridge." Data Book. Version 0.70. May 2004. PLX Technology, Inc.

"Corex-V10 PCI-X Initiator/Target" Datasheet #2. DCM Technologies, 39675 Cedar Blvd., #220, Newark, CA 94560.

"DCM Corex-V10 FAQ." version 1.00. DCM Technologies, 39675 Cedar Blvd., #220, Newark, CA 94560.

IDT. "24-lane 3-Port PCI Express Switch" Data Sheet. 89HPES24N3. Feb. 14, 2006. Integrated Device Technology, Inc.

"DCM PCI-X Verification Services" Datasheet #2. DCM Technologies, 39675 Cedar Blvd., #220, Newark, CA 94560.

IDT. "12-lane 3-Port PCI Express Switch" Data Sheet. 89HPES12N3. Feb. 14, 2006. Integrated Device Technology, Inc.

IDT. "12-lane 3-Port PCI Express Switch" Product Brief. 89PES12N3. Feb. 15, 2006. Integrated Device Technology, Inc.

"Intel 41210 Serial to Parallel PCI Bridge Datasheet." Intel Corporation. Sep. 2003.

"Intel 41210 Serial to Parallel PCI Bridge Design Guide." Intel Corporation. Nov. 2003.

QuickLogic PCI Presentation. "QuickPCI™ Family of Embedded Standard Products (ESPs)."

"QL5064—QuickPCI™" DataSheet, Rev B. Feb. 2, 2000. QuickLogic.

"IDT 89HPES12N3 PCI Express Switch." User Manual Table of Contents & Overview. Integrated Device Technology. Feb. 8, 2006.

"IDT 89HPES24N3 PCI Express Switch." User Manual Table of Contents & Overview. Integrated Device Technology. Feb. 8, 2006.

LSI Corporation. MegaRAID SAS 8408E. Product Brief. 2007.

* cited by examiner 302 interrupt request flag
304 message tag 302 interrupt request flag
304 message tag
906 CPU memory flag If CPU memory flag set, Address field stores offset into window, rather than actual memory address

```
receiving bus bridge:
if (TLP header address in CPU memory range)
    translated address = [TLP header address AND (window size - 1)] OR window base
else
    translated address = TLP header address /* TLP header address is untranslated */
```

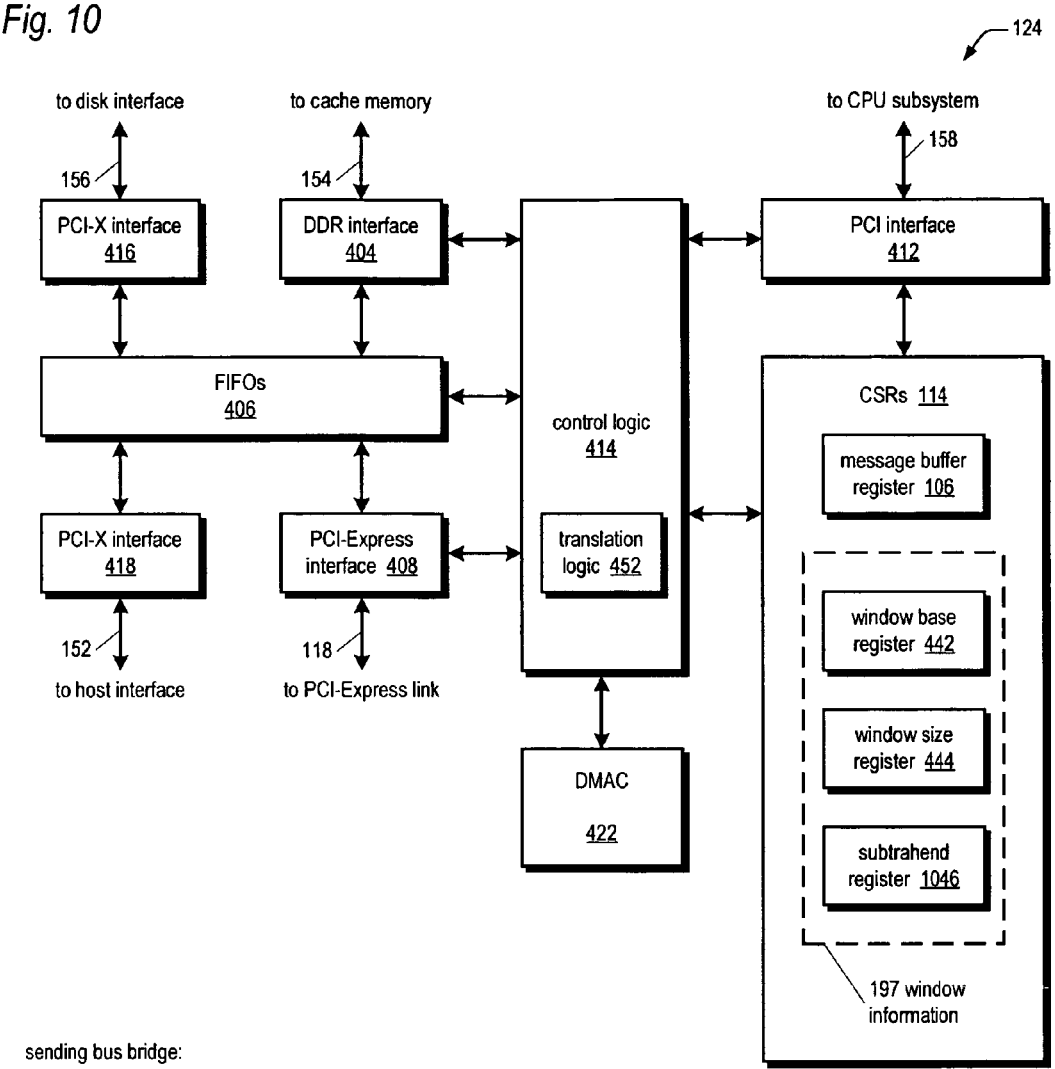

Fig. 10

```
sending bus bridge:
if (scatter/gather list address in CPU memory range)
{
    TLP header address = scatter/gather list address - subtrahend /* TLP header address is an offset within window */
    CPU memory flag = 1
} else {
    TLP header address = scatter/gather list address
    CPU memory flag = 0
} receiving bus bridge:
if (CPU memory flag)
    translated address = window base + TLP header address /* sending bus bridge makes TLP header address an offset */
else
    translated address = TLP header address /* TLP header address is untranslated */
``` receiving bus bridge:
if (TLP header address in CPU memory range)
    translated address = [TLP header address AND (window size - 1)] OR window base
else
    translated address = TLP header address /* TLP header address is untranslated */ receiving bus bridge:
if (TLP header address in CPU memory range)
    translated address = [TLP header address AND (window size - 1)] OR window base
else
    translated address = TLP header address /* TLP header address is untranslated */

SAFE MESSAGE TRANSFERS ON PCI-EXPRESS LINK FROM RAID CONTROLLER TO RECEIVER-PROGRAMMABLE WINDOW OF PARTNER RAID CONTROLLER CPU MEMORY

CROSS REFERENCE TO RELATED APPLICATION(S)

This application is a continuation-in-part (CIP) of the following co-pending Non-Provisional U.S. patent application, which is hereby incorporated by reference in its entirety for all purposes:

| Ser. No. | Filing Date | Title |
| --- | --- | --- |
| 11/178,727 now U.S. Pat. No. 7,315,911 | Jul. 11, 2005 | RAID SYSTEM FOR PERFORMING EFFICIENT MIRRORED POSTED-WRITE OPERATIONS |

Pending U.S. patent application Ser. No. 11/178,727 (CHAP.0125) claims the benefit of the following pending U.S. Provisional Application, which is hereby incorporated by reference in its entirety for all purposes:

| Ser. No. | Filing Date | Title |
| --- | --- | --- |
| 60/645,340 | Jan. 20, 2005 | METHOD FOR EFFICIENT INTER-PROCESSOR COMMUNICATION IN AN ACTIVE-ACTIVE RAID SYSTEM USING PCI-EXPRESS LINKS |

This application claims the benefit of the following Provisional U.S. Patent Application, which is hereby incorporated by reference in its entirety for all purposes:

| Ser. No. | Filing Date | Title |
| --- | --- | --- |
| 60/694,442 | Jun. 27, 2005 | SAFE INTER-CPU DMA FOR HIGH SPEED MESSAGING |

FIELD OF THE INVENTION

The present invention relates in general to the field of message transfers between redundant storage controllers, and particularly to highly reliable message transfers there between.

BACKGROUND OF THE INVENTION

Redundant Array of Inexpensive Disk (RAID) systems have become the predominant form of mass storage systems in most computer systems today that are used in applications that require high performance, large amounts of storage, and/or high data availability, such as transaction processing, banking, medical applications, database servers, internet servers, mail servers, scientific computing, and a host of other applications. A RAID controller controls a group of multiple physical disk drives in such a manner as to present a single logical disk drive (or multiple logical disk drives) to a computer operating system. RAID controllers employ the techniques of data striping and data redundancy to increase performance and data availability.

One technique for providing high data availability in RAID systems is to include redundant fault-tolerant RAID controllers in the system. Providing redundant fault-tolerant RAID controllers means providing two or more controllers such that if one of the controllers fails, one of the other redundant controllers continues to perform the function of the failed controller. For example, some RAID controllers include redundant hot-pluggable field replaceable units (FRUs) such that when a controller fails, an FRU can be quickly replaced in many cases to restore the system to its original data availability level.

Redundant fault-tolerant RAID controllers communicate with one another by passing messages to one another in order to accomplish their fault-tolerant operation. Historically, the controllers have communicated via a common communication channel such as Fibre Channel or SCSI. Typically, these communication channels are also the I/O channels by which the RAID controllers communicate with the storage devices attached to them or to the host computers for which the RAID controllers provide data. Consequently, these communication channels may be subject to service interruptions if a storage device fails or if the physical channel medium is damaged or removed. Additionally, these communications channels typically incur a relatively high latency in communicating messages back and forth between the RAID controllers. Additionally, the processing of the messages consumes a significant amount of the bandwidth of the RAID controller CPUs.

Therefore what is needed is a more reliable and efficient communication channel between redundant RAID controllers.

BRIEF SUMMARY OF INVENTION

The present invention provides a fault-tolerant mass storage system that enables one RAID controller to write messages directly into the CPU memory of the other RAID controller via a PCI-Express link, but to do so in a safe manner. In particular, the CPU on the receiving RAID controller is enabled to program a bus bridge on the receiving RAID controller with information specifying a safe window within the CPU memory for receiving the messages. When the bus bridge receives the messages from the other RAID controller via the link, if the PCI-Express packet containing the message indicates the message is destined for the CPU memory, then the bus bridges translates the destination address based on the window information into an address within the window, and writes the message only within the window, and nowhere else within the CPU memory.

In one aspect, the present invention provides a fault-tolerant mass storage system. The system includes first and second RAID controllers, coupled for communication via a PCI-Express link. Each RAID controller includes a bus bridge, coupled to the link and coupled to first and second buses. Each RAID controller also includes a cache memory, coupled to the first bus, which caches user data for storage on disk drives controlled by the controllers. Each RAID controller also includes a CPU, and a CPU memory coupled to the CPU. The CPU and CPU memory are coupled to the second bus. The CPU fetches and executes program instructions from the CPU memory. The CPU programs the bus bridge with window information defining a window of locations within the CPU memory. The window comprises less than an entirety of the CPU memory. The bus bridge receives data on the link from the other of the first and second RAID controllers. The bus bridge also writes the data to the CPU memory if destined for the CPU memory, but only within the window and nowhere else within the CPU memory. The bus bridge also writes the data to the cache memory if destined for the cache memory.

In another aspect, the present invention provides a method for reliably transferring data between first and second RAID controllers via a PCI-Express link in a fault-tolerant mass storage system, each of the RAID controllers having a bus bridge coupled to the link, to a cache memory for caching user data for storage on disk drives controlled by the RAID controllers, to a CPU, and a to CPU memory for storing program instructions fetched and executed by the CPU. The method includes the first CPU programming the first bus bridge with window information defining a window of locations within the first CPU memory. The window comprises less than an entirety of the CPU memory. The method also includes the first bus bridge receiving data on the link from the second bus bridge. The method also includes the first bus bridge writing the data to the first CPU memory if the data is destined for the first CPU memory, but only within the window and nowhere else within the first CPU memory. The method also includes the first bus bridge writing the data to the first cache memory if the data is destined for the first cache memory.

In another aspect, the present invention provides a bus bridge, for instantiation on each of two redundant array of inexpensive disks (RAID) controllers coupled for communication on a PCI-Express link. The bus bridge includes a PCI-Express interface, for coupling to the link. The PCI-Express interface receives data on the link from the PCI-Express interface of the other RAID controller. The bus bridge also includes a memory bus interface, for coupling to a cache memory, which caches user data for storage on disk drives controlled by the controllers. The bus bridge also includes a local bus interface, for coupling to a CPU and to a CPU memory from which the CPU fetches and executes program instructions. The bus bridge also includes at least one control register, programmable by the CPU with window information defining a window of locations within the CPU memory. The window comprises less than an entirety of the CPU memory. The bus bridge also includes control logic, coupled to the interfaces. The control logic determines whether the received data is destined for the CPU memory, and if so, controls the local bus interface to write the data to the CPU memory, but only within the window and nowhere else within the CPU memory. The control logic also determines whether the data is destined for the cache memory, and if so, controls the memory bus interface to write the data to the cache memory.

In another aspect, the present invention provides a fault-tolerant mass storage system. The system includes first and second RAID controllers, coupled for communication via a PCI-Express link. Each RAID controller includes a bus bridge, coupled to the link and a CPU memory, coupled to the bus bridge. The CPU memory stores program instructions and caches user data for storage on disk drives controlled by the controllers. Each RAID controller also includes a CPU, coupled to the CPU memory and to the bus bridge. The CPU fetches and executes the program instructions from the CPU memory and controls caching of the user data in the CPU memory. The CPU also programs the bus bridge with window information defining a window of locations within the CPU memory. The window comprises less than an entirety of the CPU memory. The bus bridge receives data on the link from the other RAID controller and to writes the data to the CPU memory, but only within the window and nowhere else within the CPU memory.

In another aspect, the present invention provides a method for reliably transferring data between first and second RAID controllers via a PCI-Express link in a fault-tolerant mass storage system, each of the RAID controllers having a bus bridge coupled to the link, to a CPU, and to a CPU memory for storing program instructions fetched and executed by the CPU and for caching user data for storage on disk drives controlled by the RAID controllers. The method includes the first CPU programming the first bus bridge with window information defining a window of locations within the first CPU memory. The window comprises less than an entirety of the CPU memory. The method also includes the first bus bridge receiving data on the link from the second bus bridge. The method also includes the first bus bridge writing the data to the first CPU memory, but only within the window and nowhere else within the first CPU memory.

In another aspect, the present invention provides a bus bridge, for instantiation on each of two redundant array of inexpensive disks (RAID) controllers coupled for communication on a PCI-Express link. The bus bridge includes a PCI-Express interface for coupling to the link. The PCI-Express interface receives data on the link from the PCI-Express interface of the other RAID controller. The bus bridge also includes a local bus interface, for coupling to a CPU and to a CPU memory. The CPU fetches and executes program instructions from the CPU memory. The CPU memory also caches user data for storage on disk drives controlled by the controllers. The bus bridge also includes at least one control register, programmable by the CPU with window information defining a window of locations within the CPU memory. The window comprising less than an entirety of the CPU memory. The bus bridge also includes control logic, coupled to the interfaces. The control logic controls the local bus interface to write the data to the CPU memory, but only within the window and nowhere else within the CPU memory.

In another aspect, the present invention provides a bus bridge, for instantiation on each of two redundant array of inexpensive disks (RAID) controllers coupled for communication on a PCI-Express link. The bus bridge includes a PCI-Express interface for coupling to the link. The PCI-Express interface receives data on the link from the PCI-Express interface of the other RAID controller. The bus bridge also includes a first bus interface, for coupling to a CPU. The bus bridge also includes a second bus interface, for coupling to a CPU memory from which the CPU fetches and executes program instructions and which caches user data for storage on disk drives controlled by the controllers. The bus bridge also includes at least one control register, programmable by the CPU with window information defining a window of locations within the CPU memory. The window comprises less than an entirety of the CPU memory. The bus bridge also includes control logic, coupled to the interfaces. The control logic controls the second bus interface to write the data to the CPU memory, but only within the window and nowhere else within the CPU memory.

BRIEF DESCRIPTION OF THE DRAWINGS

FIG. 10 is a block diagram illustrating in more detail the bus bridge of FIG. 1 according to an alternate embodiment of the present invention.

DETAILED DESCRIPTION

Figure 1:
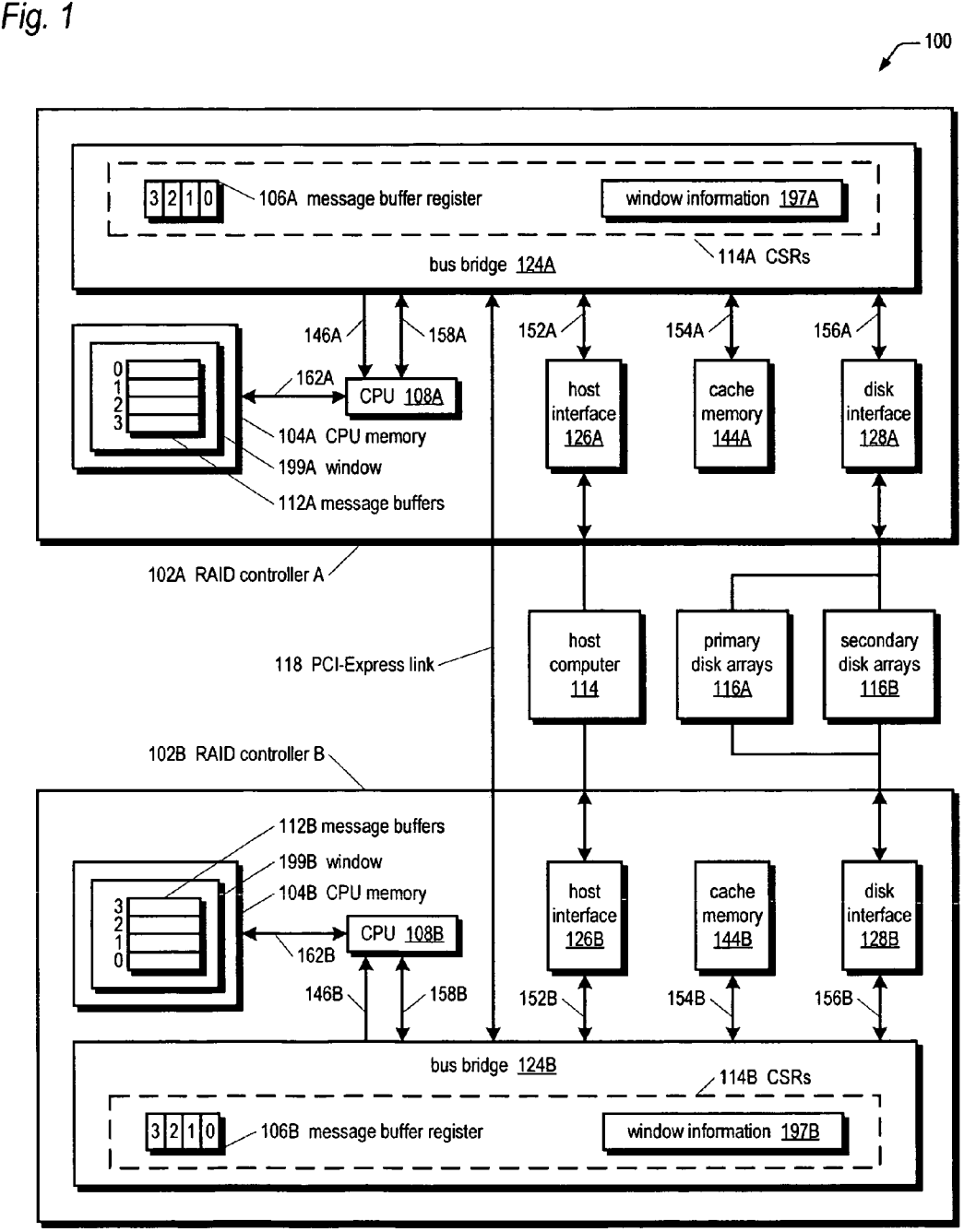
FIG. 1 is a block diagram illustrating an active-active redundant fault-tolerant RAID subsystem according to one embodiment of the present invention.

Referring now to FIG. 1, a block diagram illustrating an active-active redundant fault-tolerant RAID subsystem 100 according to one embodiment of the present invention is shown. The subsystem 100 includes two RAID controllers denoted individually RAID controller A 102A and RAID controller B 102B, generically as RAID controller 102, and collectively as RAID controllers 102. The RAID controllers 102 are coupled to one another by a PCI-Express link 118. In one embodiment, the PCI-Express link 118 comprises signal traces on a backplane or mid-plane of a chassis into which the RAID controllers 102 plug. In one embodiment, the RAID controllers 102 are hot-pluggable into the backplane.

The PCI-Express link 118 is an efficient high-speed serial link designed to transfer data between components within a computer system as described in the PCI Express Base Specification Revision 1.0a, Apr. 15, 2003. The PCI Express specification is managed and disseminated through the PCI Special Interest Group (SIG) found at www.pcisig.com. PCI-Express is a serial architecture that replaces the parallel bus implementations of the PCI and PCI-X bus specification to provide platforms with greater performance, while using a much lower pin count. A complete discussion of PCI Express is beyond the scope of this specification, but a thorough background and description can be found in the following books which are incorporated herein by reference for all purposes: *Introduction to PCI Express, A Hardware and Software Developer's Guide*, by Adam Wilen, Justin Schade, Ron Thornburg; *The Complete PCI Express Reference, Design Insights for Hardware and Software Developers*, by Edward Solari and Brad Congdon; and *PCI Express System Architecture*, by Ravi Budruk, Don Anderson, Tom Shanley; all of which are available at www.amazon.com.

Advantageously, embodiments of the system 100 of the present invention described herein utilize a PCI-Express link 118 to enable redundant fault-tolerant RAID controllers 102 to communicate by sending messages and data to one another. The PCI-Express link 118 used in the system 100 has the following advantages over legacy RAID system communications links such as Fibre Channel and SCSI: higher bandwidth, lower latency, lower cost, built-in error recovery and multiple retry mechanisms, and greater immunity to service interruptions since the link is dedicated for inter-processor communication and inter-memory transfers rather than being shared with other functions such as storage device I/O.

It is noted that the adverse impact on performance due to the processing of inter-processor messages may be particularly significant for systems that present a unified, or symmetric, management view. In a unified management view system, the RAID system presents a unified view to the host computers such that regardless of which of the two RAID controllers a host computer is actually communicating with, the RAID controller provides the same information for each of the RAID controllers and allows the host computer to configure and manage both the RAID controllers and all the disk arrays controlled by each of the RAID controllers, regardless of which of the RAID controllers actually has primary responsibility for controlling a particular disk array. The unified management view necessitates a relatively large increase in the amount of message communication and processing that must be performed between the RAID controllers. Thus, an efficient inter-processor communication method is needed.

PCI-Express provides a load-store architecture by virtue of its pedigree as a local bus. Consequently, the programming model for PCI-Express controllers is lower level than Fibre Channel or SCSI controllers, which typically provide a relatively high level programming model. In particular, data flow over a PCI-Express link is controlled by the initiating device. In contrast, data flow over Fibre Channel or SCSI is controlled by the target device.

The present disclosure describes a system 100 and method in which the RAID controllers 102 communicate with one another via the PCI-Express link 118 to communicate messages, or commands, to one another. In particular, each of the RAID controllers 102 includes a CPU having a local CPU memory for storing program instructions to be fetched and executed by the local CPU; the local CPUs have the ability to program a local bus bridge to transfer messages on the PCI-Express link 118 to the bus bridge on the other RAID controller 102, which directly writes the message to the local memory of the other CPU.

Directly writing the message to the local CPU memory is in contrast to writing the message to a cache memory of the other RAID controller 102 used for buffering data such as posted-write user data destined for disk drives, such as according to a previous system described in U.S. patent application Ser. No. 11/178,727. Directly writing the message to the local CPU memory is advantageous because accesses by the CPU to the local CPU memory are significantly faster than accesses by the CPU to the cache memory. Consequently, in the previous system, if the CPU is to access the message more than once, the receiving CPU copies the message from its cache memory to its local CPU memory; conversely, beforehand, the sending CPU copies the message from its local CPU memory to its cache memory for transmission across the PCI-Express link. Both the slower direct accesses of the cache memory and the copying to local CPU memory reduce the overall performance of the previous system. In particular, the maximum host I/O request processing rate may be reduced because the inter-processor communication consumes a significant amount of CPU bandwidth that would otherwise be used for the processing of host I/O requests. The reduction in host I/O request rate may also affect the obtainable user data bandwidth transferable between the host computers and the previous system. Additionally, the available bandwidth to the cache memory, which is mainly used for buffering user data being read from or written to the disk arrays, is adversely affected by the additional message traffic in and out of the cache memory. Furthermore, in one embodiment, the cache memory subsystem is organized with a relatively wide data path optimized for large data transfers, such as sectors or blocks, to and from the disk drives, which may be relatively inefficient for accesses by the local CPU. Thus, directly writing the message to the local CPU memory of the other RAID controller 102 may improve system 100 performance. However, directly writing the message to the local CPU memory presents at least two problems.

First, the software executing on the sending CPU must know the locations in the receiving CPU memory at which the receiving CPU expects to receive the messages. One solution is to simply fix a predetermined location. For example, the software developer may include a directive to the compiler/linker to fix the predetermined location. However, this solution has the disadvantage of being relatively inflexible, particularly if it becomes desirable in subsequent revisions of the software to change the predetermined location. If the predetermined location changes in a subsequent software revision, then both RAID controllers 102 would have to have their software upgraded simultaneously, or else they would be incompatible. However, it is desirable to have the ability to upgrade the software of one RAID controller 102 at a time so that if the new software version is defective or otherwise undesirable, it may be backed out by retrograding to an earlier software version. It is desirable to upgrade the software of one RAID controller 102 at a time so that the other RAID controller 102 can continue to operate to provide continuous data availability, i.e., to continue to make the data stored on the disk arrays available to the host computers. Another solution is to have the two CPUs negotiate at boot time for an agreed-upon location. However, the CPUs need an agreed-upon location in order to negotiate for an agreed-upon location; thus, a chicken-and-egg type dilemma is presented.

Second, there is a danger that a software or hardware failure on the sending RAID controller 102 may cause it to write to an undesirable location within the receiving CPU memory, such as overwriting the programs being executed by the receiving CPU, causing the receiving RAID controller 102 to also fail. This would be disastrous in the context of a fault-tolerant system such as system 100, which is designed to continue to provide data availability in the event of a failure of one of the RAID controllers 102, but not both.

To address these problems the present disclosure describes a system and method for a RAID controller 102 to safely receive messages from the other RAID controller 102 directly into its local CPU memory by providing the receiving CPU the ability to control the location in its CPU memory to which the received messages will be written. In particular, the receiving CPU defines the location and size of a window of memory locations within its CPU memory by programming a bus bridge that receives incoming packets on the PCI-Express link 118 from the other RAID controller 102. The bus bridge writes the message contained in the received packet into the CPU memory, but first translates the address specified in the packet to restrict the writing of the message into the window, as described in detail herein.

Each of the RAID controllers 102 of FIG. 1 are identical and will be described generically; however, each element in FIG. 1 includes an A or B suffix on its reference numeral to indicate the element is part of RAID controller A 102A or RAID controller B 102B, respectively.

Each RAID controller includes a CPU 108, or processor 108, or CPU complex 108. The CPU 108 may be any processor capable of executing stored programs, including but not limited to, for example, a processor and chipset, such as an x86 architecture processor and what are commonly referred to as a North Bridge or Memory Control Hub (MCH) and a South Bridge or I/O Control Hub (ICH), which includes I/O bus interfaces, such as an interface to an ISA bus or a PCI-family bus. In one embodiment, the CPU complex 108 comprises a Transmeta TM8800 processor that includes an integrated North Bridge and an ALi M1563S South Bridge. In another embodiment, the CPU 108 comprises an AMD Elan SC-520 microcontroller. In another embodiment, the CPU 108 comprises an Intel Celeron M processor and an MCH and ICH.

Coupled to the CPU 108 is random access memory (RAM) 104, or CPU memory 104, from which the CPU 108 fetches and executes stored programs. In one embodiment, the CPU memory 104 comprises a double-data-rate (DDR) RAM, and the CPU 108 is coupled to the DDR RAM 104 via a DDR bus 162, which may be presented by a North Bridge or MCH, for example.

In addition to storing programs for the CPU 108 to execute, the CPU memory 104 is used to buffer messages and data received from the other RAID controller 102 via the PCI-Express link 118 for inter-processor 108 communication. In particular, a window 199 of locations within the CPU memory 104 is maintained for the other RAID controller 102 to write into. The window 199 comprises a subset of the CPU memory 104, i.e., less than the entirety of the CPU memory 104. The window 199 is defined by window information 197 stored within a bus bridge 124, described below. The CPU 108 controls the location and size of the window 199 by programming the window information 197 into the bus bridge 124 when the RAID controller 102 boots up. When the bus bridge 124 receives a packet on the PCI-Express link 118 from the other RAID controller 102 that indicates it is destined for the CPU memory 104, the bus bridge 124 will only write the data within the window 199, and will not write the data outside the window 199, as described herein. Consequently, the potential problems described above with directly writing to the CPU memory 108—namely knowing an agreed-upon location within the CPU memory 104, and the danger that a failure on the sending RAID controller 102 may cause it to write to an unauthorized location within the receiving CPU memory 108 that causes the receiving RAID controller 102 to fail also—are addressed by the bus bridge 124 restricting writes by the other RAID controller 102 to the CPU memory 104 within the window 199 defined by the local CPU 108.

In one embodiment, the software executing on the CPU 108 allocates a portion of the window 199 in the CPU memory 104 to a plurality of message buffers 112. FIG. 1 illustrates four message buffers 112, denoted 0 through 3; however, it should be understood that other embodiments are contemplated in which the number of message buffers 112 is more or less than four, and the number of message buffers 112 may be tailored to the number of messages that a RAID controller 102 needs to queue up to the other RAID controller 102, to the rate at which the receiving RAID controller 102 is capable of processing received messages, and to the number of bits available for use as the message tag field 304 (shown in FIG. 3) in the memory write request TLP header, as described in more detail below. In one embodiment, each message buffer is 1056 bytes.

In one embodiment, each CPU 108 allocates space for a set of send message buffers 112 and for a set of receive message buffers 112 within the window 199. In one embodiment, each message buffer 112 comprises a normal/acknowledge buffer pair. The normal buffer is used to send or receive normal messages, whereas the acknowledge buffer is used strictly to send or receive an acknowledge message to the other controller to acknowledge receipt of a normal message received in the paired buffer. In one embodiment, the send message buffers 112 are used by the CPU 108 in a sequential order and the CPU 108 processes incoming messages in the receive message buffers 112 in sequential order.

Also coupled to the CPU 108 is the bus bridge 124. In one embodiment, the CPU 108 and bus bridge 124 are coupled by a local bus 158, such as a PCI, PCI-X, PCI-Express, or other PCI family local bus. Coupled to the bus bridge 124 are a cache memory 144, a host interface 126, and a disk interface 128. In one embodiment, the cache memory 144 comprises a DDR RAM coupled to the bus bridge 124 via a DDR bus 154. In one embodiment, the host interface 126 and disk interface 128 comprise PCI-X or PCI-Express devices coupled to the bus bridge 124 via respective PCI-X or PCI-Express buses. The cache memory 144 is used to buffer and cache user data as it is transferred between host computers 114 and disk arrays 116 via the host interface 126 and disk interface 128, respectively.

The disk interface 128 interfaces the RAID controller 102 to the disk arrays 116, which comprise disk drives or other mass storage devices, including but not limited to, tape drives, solid-state disks (SSD), and optical storage devices, such as CDROM or DVD drives. The disk arrays 116 store user data. The disk interface 128 may include, but is not limited to, the following interfaces: Fibre Channel, Small Computer Systems Interface (SCSI), Advanced Technology Attachment (ATA), Serial Attached SCSI (SAS), Serial Advanced Technology Attachment (SATA), Ethernet, Infiniband, HIPPI, ESCON, iSCSI, or FICON. The RAID controller 102 reads and writes data from or to the disk arrays 116 in response to I/O requests received from host computers 114. The disk interface 128 is coupled to the bus bridge 124 via a local bus 156, such as a PCI, PCI-X, PCI-Express, or other PCI family local bus.

The host interface 126 interfaces the RAID controller 102 with the host computers 114. In one embodiment, the RAID controller 102 is a local bus-based controller, such as a controller that plugs into, or is integrated into, a local I/O bus of the host computer system 114, such as a PCI, PCI-X, CompactPCI, PCI-Express, PCI-X2, EISA, VESA, VME, RapidIO, AGP, ISA, 3GIO, HyperTransport, Futurebus, MultiBus, or any other local bus. In this type of embodiment, the host interface 126 comprises a local bus interface of the local bus type. In another embodiment, the RAID controller 102 is a standalone controller in a separate enclosure from the host computers 114 that issue I/O requests to the RAID controller 102. For example, the RAID controller 102 may be part of a storage area network (SAN). In this type of embodiment, the host interface 126 may comprise various interfaces such as Fibre Channel, Ethernet, InfiniBand, SCSI, HIPPI, Token Ring, Arcnet, FDDI, LocalTalk, ESCON, FICON, ATM, SAS, SATA, iSCSI, and the like. The host interface 126 is coupled to the bus bridge 124 via a local bus 152, such as a PCI, PCI-X, PCI-Express, or other PCI family local bus.

The CPU 108, host interface 126, and disk interface 128, read and write data from and to the cache memory 144 via the bus bridge 124. The CPU 108 fetches and executes instructions of programs stored in the CPU memory 104 that control the transfer of data between the disk arrays 116 and the hosts 114. The CPU 108 receives commands from the hosts 114 to transfer data to or from the disk arrays 116. In response, the CPU 108 issues commands to the disk interface 128 to accomplish data transfers with the disk arrays 116. Additionally, the CPU 108 provides command completions to the hosts 114 via the host interface 126. The CPU 108 may also perform storage controller functions such as RAID control, logical block translation, buffer management, and data caching.

The bus bridge 124 includes control and status registers (CSRs) 114 by which the CPU 108 programs the bus bridge 124. The CSRs 114 include registers for storing the window information 197, as described in more detail below with respect to FIG. 4.

The CSRs 114 also include a message buffer register 106. The message buffer register 106 includes a bit corresponding to each of the message buffers 112. If a bit is set in the message buffer register 106 it indicates that the corresponding message buffer 112 contains a valid message. When the bus bridge 124 receives a memory write request TLP on the PCI-Express link 118 with the interrupt request flag 302 set, it examines the predetermined message tag field 304 of the TLP header 300 (shown in FIG. 3) to determine to which of the message buffers 112 a message was written. The message tag 304 enables the receiving bus bridge 124 to efficiently determine which message buffer 112 is the destination of the message. Advantageously, the message buffer register 106 enables the receiving CPU 108 to quickly determine which of the message buffers 112 contain a valid message from the other RAID controller 102 without having to examine the contents of the message buffers 112 to determine which of them are valid. This is particularly efficient since a RAID controller 102 may send multiple messages to the other RAID controller 102 in a queued fashion. In one embodiment, the CPU 108 clears a message buffer register 106 bit by writing a Boolean one to the bit.

The bus bridge 124 generates an interrupt signal 146 coupled to the CPU 108. In one embodiment, the interrupt signal 146 is part of the local bus 158 coupling the CPU 108 and the bus bridge 124, such as a PCI interrupt signal. The bus bridge 124 interrupts the CPU 108 via the interrupt signal 146 in response to receiving a memory write request TLP having a set interrupt request flag 302 (shown in FIG. 3), as described in detail below. Advantageously, the interrupt request flag 302 enables the sending RAID controller 102 to interrupt the CPU 108 of the receiving RAID controller 102 to inform the receiving CPU 108 that it has received a message from the other RAID controller 102 without having to include a discrete interrupt line from the sending RAID controller 102 to the receiving RAID controller 102 CPU 108, and without having to incur the overhead of sending a second TLP, such as a PCI message signaled interrupt (MSI), to interrupt the receiving CPU 108. Additionally, it alleviates the bus bridge 124 from including the complexity of sending and receiving MSIs. That is, the design complexity of the bus bridge 124 may be significantly reduced. In one embodiment, the bus bridge 124 is included on a highly complex single integrated circuit also including extensive circuitry for performing the bus bridge and memory controller functions; hence, the reduced design complexity and concomitant chip area reduction enjoyed by alleviating MSI support is potentially a significant advantage.

Having multiple message buffers 112 enables the transmitting RAID controller 102 to queue multiple messages to the other RAID controller 102 before receiving an acknowledgement. Consequently, when the receiving CPU 108 services an interrupt, multiple messages may have been received from the sending RAID controller 102, particularly if the receiving CPU 108 is busy servicing other higher priority events. The message buffer register 106 advantageously enables the CPU 108 to quickly determine which of multiple message buffers 112 have valid messages.

As mentioned above, accesses by the CPU 108 to the local CPU memory 104 are significantly faster than accesses by the CPU 108 to the cache memory 144. One reason the accesses by the CPU 108 to the CPU memory 104 are significantly faster than accesses by the CPU 108 to the cache memory 144 is because the cache memory 144 is not mapped by the CPU 108 as a region of memory that is cacheable by the CPU 108 cache, whereas the CPU memory 104 is mapped as a region that is cacheable by the CPU 108 cache. Another reason accesses by the CPU 108 to the local CPU memory 104 are significantly faster than accesses by the CPU 108 to the cache memory 144 is that the CPU 108 can more directly access the CPU memory 104 (for example, via the memory controller in the North Bridge or MCH); whereas, the CPU 108 must access the cache memory 144 through bus bridge 124 via local bus 158. Advantageously, the present disclosure describes a system and method for the RAID controller 102 to directly transfer a message into the CPU memory 104 of the receiving RAID controller 102, which the receiving CPU 108 may access faster than its cache memory 144 to process the message.

Figure 2:
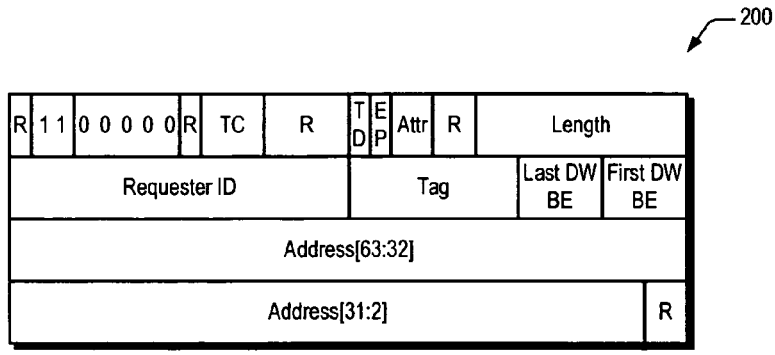
FIG. 2 is a block diagram illustrating a prior art PCI-Express memory write request transaction layer packet (TLP) header.

Referring now to FIG. 2, a block diagram illustrating a prior art PCI-Express memory write request transaction layer packet (TLP) header 200 is shown. The packet header 200 of FIG. 2 illustrates a standard four double word header with data format memory write request TLP header as specified by the current PCI Express Base Specification Revision 1.0a, Apr. 15, 2003. The header 200 includes four 32-bit double words. The first double word includes, from left to right: a reserved bit (R); a Boolean 11 value in the Format field denoting that the TLP header is four double word header with data format TLP; a Boolean 00000 value in the Type field to denote that the TLP includes a memory request and address routing is to be used; a reserved bit (R); a 3-bit Transaction Class (TC) field; four reserved bits (R); a TLP Digest bit (TD); a poisoned data (EP) bit; two Attribute (Attr) bits; two reserved bits (R); and ten Length bits specifying the length of the data payload. The second double word includes, from left to right: a 16 bit Requester ID field; a Tag field; a Last double word byte enable (DW BE) field; and a First double word byte enable (DW BE) field. The third double word includes a 32-bit Address field which specifies bits 63:32 of the destination memory address of the data payload. The fourth double word includes a 30-bit Address field which specifies bits 31:2 of the destination memory address of the data payload, followed by two reserved (R) bits.

Figure 3:
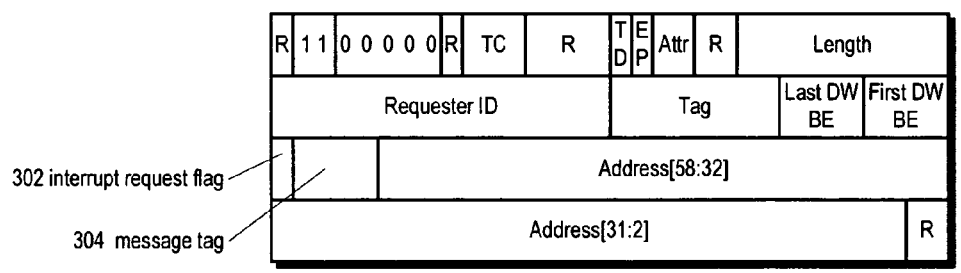
FIG. 3 is a block diagram illustrating a modified PCI-Express memory write request transaction layer packet (TLP) header according to the present invention.

Referring now to FIG. 3, a block diagram illustrating a modified PCI-Express memory write request transaction layer packet (TLP) header 300 according to the present invention is shown. The modified TLP packet header 300 is similar to the standard TLP packet header 200 of FIG. 2; however, the modified TLP packet header 300 includes an interrupt request flag 302 that occupies bit 63 of the Address field; and includes a message tag field 304 that occupies a plurality of bits in the Address field. In the embodiment of FIG. 3, the message tag 304 is 4 bits occupying bits 62:59 of the Address field. The Address field bits occupied by the interrupt request flag 302 and the message tag 304 are not interpreted by the bus bridge 124 as part of the Address field. Rather, the Address field is shortened relative to the standard PCI-Express TLP header 200 of FIG. 2. Thus, the modified TLP packet header 300 of FIG. 3 reduces the memory address space that may be accessed by the RAID controllers 102 in the other RAID controller 102 in exchange for the capability to transfer data and interrupt the receiving CPU 108 using a single TLP, and in exchange for the capability to queue multiple messages to multiple message buffers 112 and efficiently specify and detect to which of the message buffers 112 the queued messages have been written. A set interrupt request flag 302 instructs the bus bridge 124 to interrupt 146 the CPU 108 after writing the data payload of the TLP to the CPU memory 104. A set interrupt request flag 302 also instructs the bus bridge 124 to set the bit in the message buffer register 106 specified by the message tag 304 value before interrupting the CPU 108.

Although FIG. 3 illustrates a 4-bit message tag 304 which provides for up to 16 distinct message buffers 112, it should be understood that the message tag 304 may occupy more or less bits to accommodate more or less message buffers 112 according to the needs of the system 100. Furthermore, although FIG. 3 illustrates using particular bits of the Address field for the interrupt request flag 302 and message tag 304, the invention is not limited to those particular bits; rather, other bits may be used, as described below.

Figure 9:
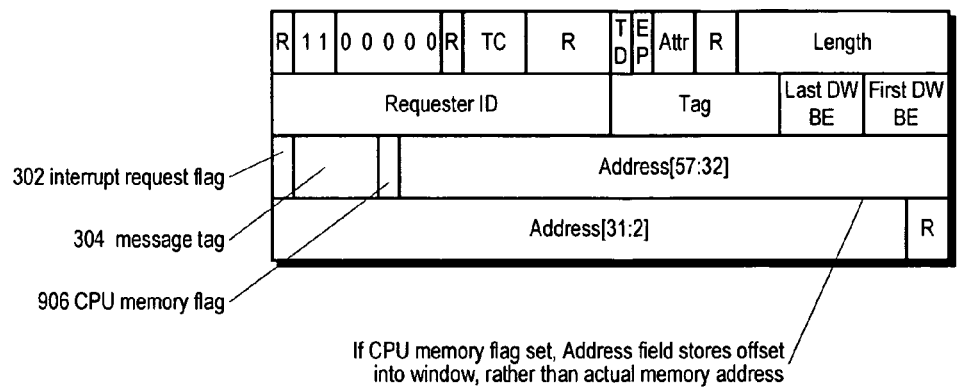
FIG. 9 is a block diagram illustrating a modified PCI-Express memory write request transaction layer packet (TLP) header according to an alternate embodiment of the present invention.

Referring now to FIG. 9, a block diagram illustrating a modified PCI-Express memory write request transaction layer packet (TLP) header 900 according to an alternate embodiment of the present invention is shown. The modified TLP packet header 900 is similar to the modified TLP packet header 300 of FIG. 3; however, the modified TLP packet header 900 of FIG. 9 also includes a CPU memory flag 906 that occupies bit 58 of the Address field, in the embodiment of FIG. 9. A set CPU memory flag 906 indicates to the receiving bus bridge 124 that the payload data is destined for the CPU memory 104, and that the value contained in the Address field specifies the destination location of the payload data within the destination window 199 as an offset relative to the base of the window 199; a clear CPU memory flag 906 indicates to the receiving bus bridge 124 that the payload data is destined for the cache memory 144, and that the value contained in the Address field specifies the destination location of the payload data within the cache memory 144. Use of the CPU memory flag 906 is described below with respect to FIG. 7.

Figure 4:
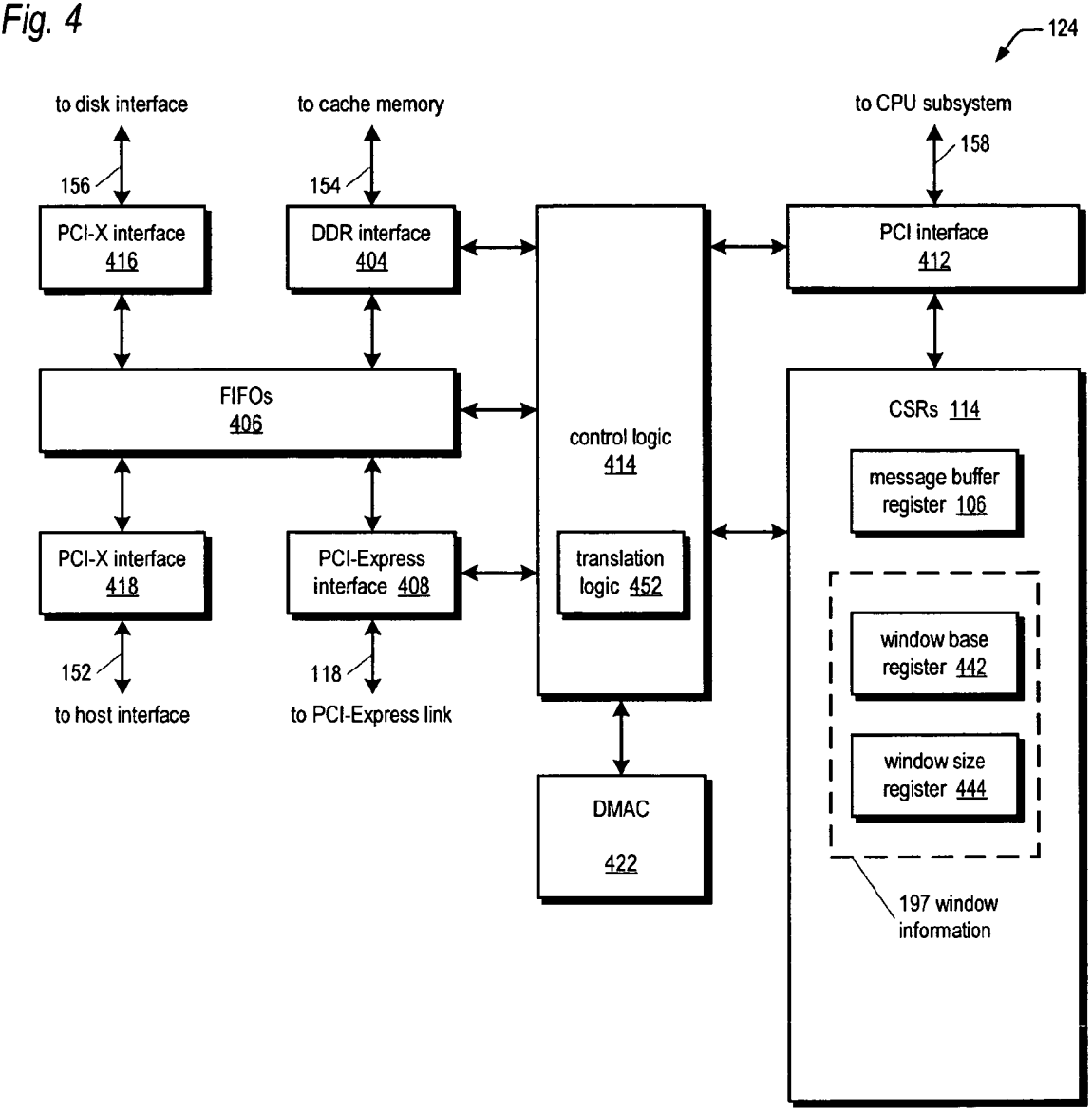
FIG. 4 is a block diagram illustrating in more detail the bus bridge of FIG. 1 according to the present invention.

Referring now to FIG. 4, a block diagram illustrating in more detail the bus bridge 124 of FIG. 1 according to the present invention is shown. The bus bridge 124 includes control logic 414 for controlling various portions of the bus bridge 124 as described below.

The bus bridge 124 also includes a local bus interface 416 (such as a PCI-X interface) for interfacing the bus bridge 124 to the disk interface 128; another local bus interface 418 (such as a PCI-X interface) for interfacing the bus bridge 124 to the host interface 126; a memory bus interface 404 (such as a DDR SDRAM interface) for interfacing the bus bridge 124 to the cache memory 144; and a PCI-Express interface 408 for interfacing the bus bridge 124 to the PCI-Express link 118. The local bus interfaces 416 and 418, memory bus interface 404, and PCI-Express interface 408 are all coupled to the control logic 414 and are also coupled to buffers 406 (such as first-in-first-out (FIFO) buffers) that buffer data transfers between the various interfaces and provide parallel high-speed data paths there between. The bus bridge 124 also includes a local bus interface 412, such as a PCI or PCI-X interface, coupled to the control logic 414, for interfacing the bus bridge 124 to the CPU 108 and CPU memory 104. The CPU 108 accesses the cache memory 144, disk interface 128, and host interface 126 via the PCI interface 412.

The PCI-Express interface 408 performs the PCI-Express protocol on the PCI-Express link 118, including transmitting and receiving PCI-Express packets, such as PCI-Express TLPs and data link layer packets (DLLPs), and in particular memory write request TLPs, as described with respect to FIGS. 2 and 3. In one embodiment, with the exception of the interrupt request flag 302, message tag field 304, and related functional modifications described herein, the PCI-Express interface 408 substantially conforms to relevant portions of the PCI Express Base Specification Revision 1.0a, Apr. 15, 2003.

The control logic 414 includes a direct memory access controller (DMAC) 422 that is programmable by the CPU 108 to perform a direct memory data transfer from a location in the RAID controller 102A cache memory 144A to a location in the RAID controller 102B cache memory 144B, as described in U.S. patent application Ser. No. 11/178,727. Advantageously, the present disclosure describes embodiments in which the DMAC 422 is also programmable by the CPU 108 to perform a direct memory data transfer from a location in the RAID controller 102A CPU memory 104A to a location in the RAID controller 102B CPU memory 104B, which may increase the performance of the system 100 because the CPU 108 accesses the CPU memory 104 more quickly than it accesses the cache memory 144, as discussed above. In particular, the bus bridge 124 enables the receiving CPU 108 to control the window 199 of locations of the receiving CPU memory 104 within which the sending CPU 108 may write the data, as described herein. The data may comprise messages, such as messages to facilitate redundant active-active fault-tolerant operation of the system 100.

In one embodiment, the DMAC 422 is capable of transferring a series of physically discontiguous data chunks whose memory locations are specified by a scatter/gather list whose base address the processor 108 programs into an address register. The DMAC 422 uses the scatter/gather list address/length pairs to transmit multiple PCI-Express memory write request transaction layer packets (TLPs) including data chunks over the PCI-Express link 118 to the CPU memory 104 or cache memory 144 of the other RAID controller 102. In one embodiment, the scatter/gather list may include a mix of destinations of the CPU memory 104 and cache memory 144, i.e., the sending CPU 108 may create a scatter/gather list including one or more elements specifying transfer of data destined for the other RAID controller's 102 CPU memory 104 and one or more elements specifying transfer of data destined for the other RAID controller's 102 cache memory 144.

In one embodiment, each scatter/gather list element includes an interrupt request bit and message tag field. If the interrupt request bit in the scatter/gather list element is set, then the bus bridge 124 populates the message tag field 304 with the scatter/gather list element message tag field value and sets the interrupt request flag 302 of the TLP header 300 (shown in FIG. 3) whose data is described by the scatter/gather list element to cause the receiving CPU 108 to be interrupted when the data chunk is written to the receiving RAID controller's 102 CPU memory 104 or cache memory 144.

The CSRs 114 also include a window base register 442 and a window size register 444 for storing the window information 197. The window base register 442 is programmed by the CPU 108 with the base memory address of the window 199 in the CPU memory 104, i.e., the first location in the CPU memory 104 within the window 199. In the embodiment of FIG. 4, the base memory address of the window 199 must be a multiple of the size of the window 199, i.e., the window 199 must be aligned on a window-sized boundary. The window size register 444 is programmed by the CPU 108 with the size of the window 199, which in the embodiment of FIG. 4 must be a power of two.

The control logic 414 also includes translation logic 452. As shown in FIG. 4, if the destination address specified in the incoming TLP header 300 Address field of FIG. 3 indicates the payload data is destined for the cache memory 144, then the bus bridge 124 does not translate the destination address, and writes the payload data into the cache memory 144 at the un-translated destination address. However, if the destination address indicates the payload data is destined for CPU memory 104, then the translation logic 452 translates the destination address based on the window information 197. The bus bridge 124 determines whether the payload data is destined for CPU memory 104 or cache memory 144 based on a predetermined mapping of the CPU memory 104 and cache memory 144 within the address space, an example of which is shown in FIG. 5.

Figure 5:
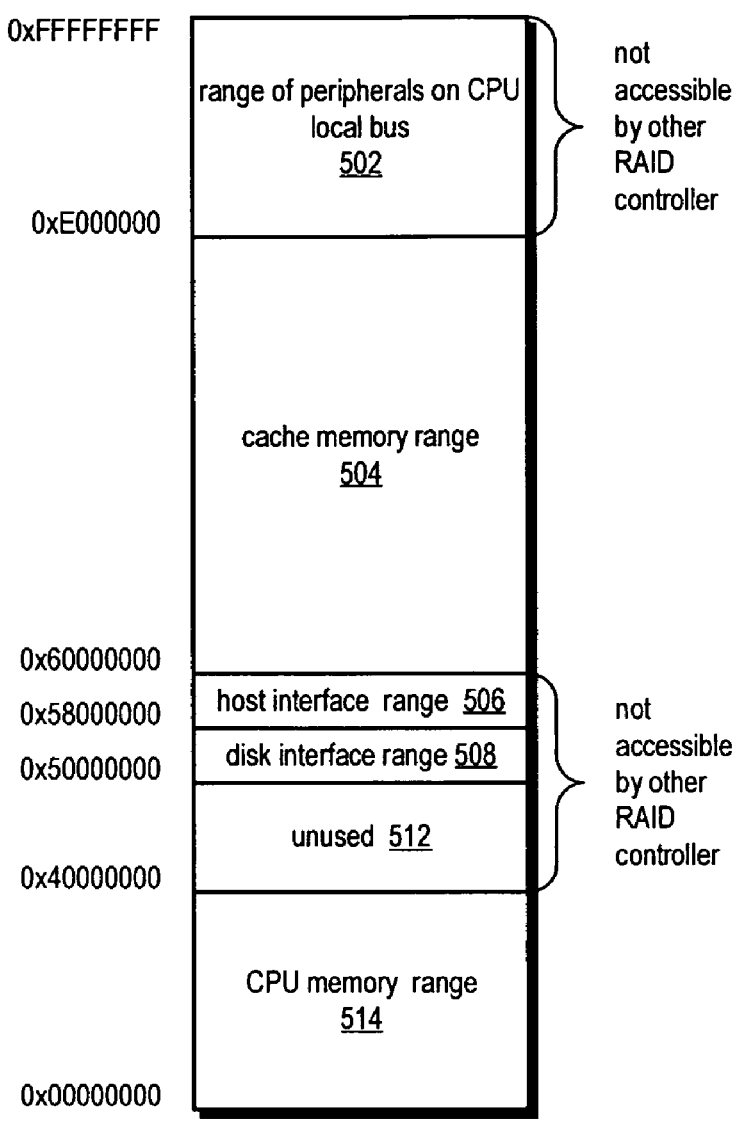
FIG. 5 is a block diagram illustrating a memory map of the memory address space of the bus bridge according to an example embodiment of the present invention.

Referring briefly to FIG. 5, a block diagram illustrating a memory map of the memory address space of the bus bridge 124 according to an example embodiment of the present invention is shown. According the example address space of FIG. 5, the CPU memory 104 occupies the lower 512 MB address range from 0x00000000 to 0x3FFFFFFF denoted 514, and the cache memory 144 occupies a 1 GB address range from 0x60000000 to 0xDFFFFFFF denoted 504. The disk interface 128 and host interface 126 occupy the ranges 0x50000000 to 0x57FFFFFF and 0x58000000 to 0x5FFFFFFF, denoted 508 and 506, respectively, and other devices within the CPU complex 108, such as a South Bridge, serial ports, timers, real time clock, temperature sensors, LED controls, etc., occupy the upper 512 MB address range from 0xE0000000 to 0xFFFFFFFF denoted 502. In one embodiment, the bus bridge 124 does not allow the other RAID controller 102 to access devices in the latter two address ranges.

Referring again to FIG. 4, the translation logic 452 forms the translated address by performing a Boolean AND of the destination address with the window size less one to mask off the upper address bits, and then performing a Boolean OR of the result with the window base to replace the masked-off upper address bits with the upper address bits of the window 199 base, according to equation (1):

translated address=[*TLP* header address AND (window size−1)] OR window base      (1)

In one embodiment, the CPU 108 programs the window size register 444 with a value that is one less than the actual window 199 size, thereby alleviating the bus bridge 124 from subtracting one. Thus, for example, if the size of the window 199 is 64 KB, the CPU 108 programs the window size register 444 with a value of 0x0000FFFF. In this example, assume the destination address specified in the incoming TLP header 300 Address field of FIG. 3 is 0x000A0200 and the window base register 442 is programmed with a value of 0x000B0000. The receiving bus bridge 124 generates the translated address as follows according to equation (1):

translated address=[0x000A0200 AND 0x0000FFFF]
    OR 0x000B0000, which is 0x000B0200

It is noted that although the location of the window 199 within the CPU memory 104 of one RAID controller 102A may be different from the other RAID controller 102B (i.e., though the values of the window base register 442 are different), in one embodiment, the structure of the data within the window 199 in one RAID controller 102A is effectively a mirror image of the structure of the data within the window 199 in the other RAID controller 102B. For example, the message buffers 112A of RAID controller A 102A may be located in the same relative location within window 199A as the location of the message buffers 112B within the window 199B of RAID controller B 102B. Stated alternatively, the distance of the message buffers 112A from the window base register 442A value of RAID controller A 102A may be equal to the distance of the message buffers 112B from the window base register 442B value of RAID controller B 102B, even though the values in the window base register 442A and window base register 442B may be different.

Referring now to FIG. 10, a block diagram illustrating in more detail the bus bridge 124 of FIG. 1 according to an alternate embodiment of the present invention is shown. The header 900 of FIG. 9 is intended for use in an embodiment that includes the bus bridge 124 of FIG. 10. The bus bridge 124 of FIG. 10 is similar to the bus bridge 124 of FIG. 4; however, the bus bridge 124 of FIG. 10 also includes a subtrahend register 1046 that stores a subtrahend value included as part of the window information 197. The subtrahend is used by the bus bridge 124 when the bus bridge 124 is the message sending bus bridge 124, rather than the message receiving bus bridge 124. In this embodiment, each scatter/gather list element includes a CPU memory flag that the sending CPU 108 sets to indicate that the data specified by the address and size of the scatter/gather list element is destined for the CPU memory 104 of the other RAID controller 102. If the sending bus bridge 124 determines that the CPU memory flag is set in the scatter/gather list element, then the sending bus bridge 124 sets the CPU memory flag 906 in the corresponding TLP transmitted to the other bus bridge 124 on the PCI-Express link 118. Additionally, if the sending bus bridge 124 determines that the CPU memory flag is set in the scatter/gather list element, then the sending bus bridge 124 subtracts the subtrahend value stored in the subtrahend register 1046 from the address in the scatter/gather list element and populates the result, or offset, into the Address field of the TLP header 900. As mentioned above with respect to FIG. 9 and below with respect to FIG. 7, if the receiving bus bridge 124 determines that the CPU memory flag 906 is set in the header 900 of an incoming TLP, then the translation logic 452 of the receiving bus bridge 124 adds the offset to its window base register 442 value to calculate the destination address of the payload data within the CPU memory 104, according to equation (2):

$$\text{translated address} = \text{window base} + TLP \text{ header address} \quad (2)$$

The CPU 108 populates the subtrahend register 1046 with the subtrahend value after being reset, as described below with respect to block 606 of FIG. 6.

An advantage of the embodiment of FIGS. 9 and 10 is that it provides a finer granularity of the location of the window 199. In particular, it enables the software developer to allow the compiler/linker to assign the location of the data structures within the window 199, such as the message buffers 112, without having to guarantee that the window is aligned on an address which is a quantum of the size of the window 199. The advantage is gained at the cost of having the subtrahend register 1046 and slightly more complicated translation logic.

Figure 6:
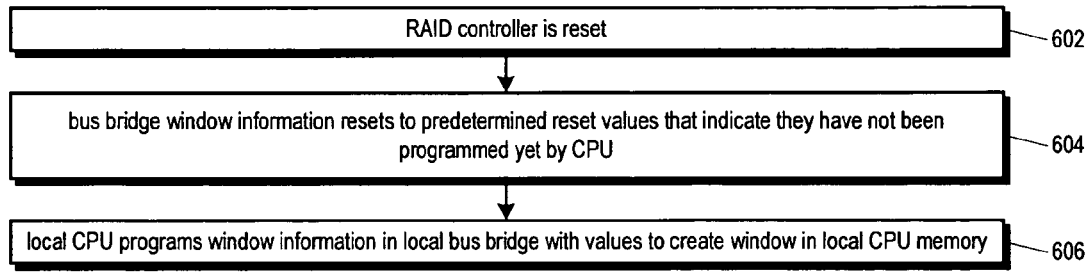
FIG. 6 is a flowchart illustrating operation of the system of FIG. 1 according to the present invention.

Referring now to FIG. 6, a flowchart illustrating operation of the system 100 of FIG. 1 according to the present invention is shown. Although FIG. 6 describes the operation of only one RAID controller 102, the same operation may occur on each of the RAID controllers 102, either simultaneously, such as in response to the system 100 being powered up, or independently. Flow begins at block 602.

At block 602, the CPU 108 and bus bridge 124 receive a reset, typically due to the RAID controller 102 receiving a reset. Flow proceeds to block 604.

At block 604, the window information 197 in the bus bridge 124 resets to predetermined reset values. The presence of the predetermined reset values indicates that the window information 197 has not been programmed yet by the CPU 108. In one embodiment, the predetermined reset values are zero in each of the window base register 442 and window size register 444. Flow proceeds to block 606.

At block 606, during its boot process, the CPU 108 programs the window information 197 into the bus bridge 124 with values that create the window 199 of a size and at a location specified by the window size register 444 and window base register 442, respectively. Additionally, in the embodiment of FIG. 10, the CPU 108 also programs the subtrahend register 1046 with the subtrahend value. Flow ends at block 606.

Figure 7:
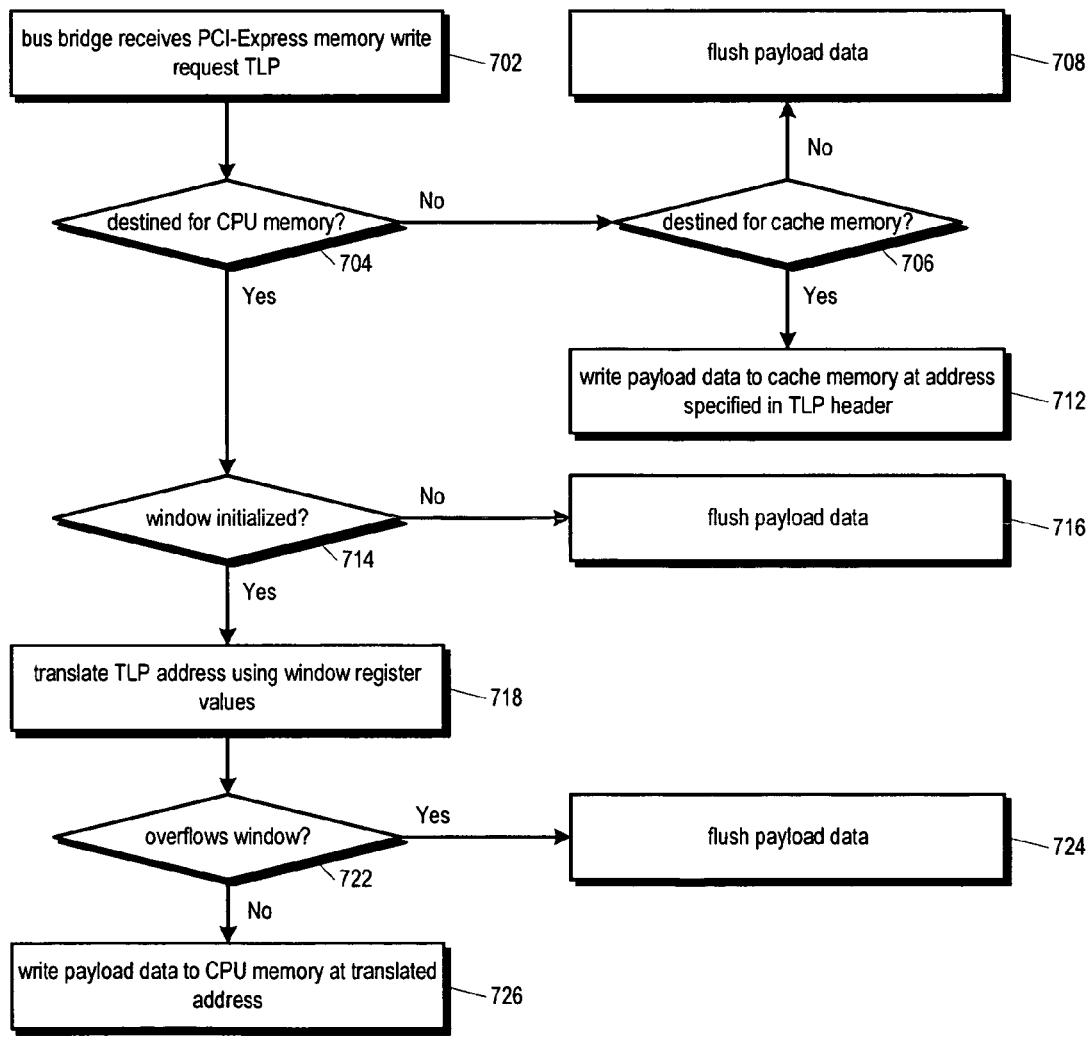
FIG. 7 is a flowchart illustrating operation of the system of FIG. 1 according to the present invention.

Referring now to FIG. 7, a block diagram illustrating operation of the system 100 of FIG. 1 according to the present invention is shown. It is noted that although FIG. 7 describes a safe inter-CPU memory 104 data transfer from the CPU memory 104A of RAID controller A 102A to the CPU memory 104B of RAID controller B 102B, the same operation may occur in the other direction. Flow begins at block 702.

At block 702, bus bridge 124B receives a PCI-Express memory write request transaction layer packet (TLP) on the PCI-Express link 118 from bus bridge 124A. Flow proceeds to decision block 704.

At decision block 704, the control logic 414 of bus bridge 124B examines the TLP header 300 and determines whether the TLP payload data is destined for the CPU memory 104B. In the embodiment according to FIGS. 3 and 4, the control logic 414 determines whether the TLP payload data is destined for the CPU memory 104B by determining whether the destination address in the Address field of the TLP header 300 is within the CPU memory range 514 of FIG. 5. In the embodiment according to FIGS. 9 and 10, the control logic 414 determines whether the TLP payload data is destined for the CPU memory 104B by determining whether the CPU memory flag 906 of the TLP header 900 is set. If the payload data is destined for the CPU memory 104B, flow proceeds to decision block 714; otherwise, flow proceeds to decision block 706.

At decision block 706, the control logic 414 of bus bridge 124B determines the TLP payload data is destined for the cache memory 144B. In the embodiment according to FIGS. 3 and 4, the control logic 414 determines whether the TLP payload data is destined for the cache memory 144 by determining whether the destination address in the Address field of the TLP header 300 is within the cache memory range 504 of FIG. 5. In the embodiment according to FIGS. 9 and 10, the control logic 414 determines whether the TLP payload data is destined for the cache memory 144 by determining whether the CPU memory flag 906 of the TLP header 900 is clear. If the payload data is destined for the cache memory 144B, flow proceeds to block 712; otherwise, flow proceeds to block 708.

At block 708, the control logic 414 of bus bridge 124B flushes the payload data, i.e., does not write the payload data anywhere, much less to cache memory 144B. In one embodiment, if the incoming TLP indicated that the write request was a certified memory-to-memory transfer type request, then the control logic 414 of bus bridge 124B also controls the PCI-Express interface 408 to return an acknowledgement packet to bus bridge 124A indicating that an error occurred because the destination address was invalid. U.S. patent application Ser. No. 11/317,504 filed Dec. 22, 2005, entitled CERTIFIED MEMORY-TO-MEMORY DATA TRANSFER BETWEEN ACTIVE-ACTIVE RAID CONTROLLERS, which is incorporated by reference herein, describes a system and method for certified memory-to-memory transfer type write requests that may be adapted to perform safe inter-CPU memory 104 transfers, rather than inter-cache memory 144 transfers. Flow ends at block 708.

At block 712, the control logic 414 of bus bridge 124B controls the cache memory interface 404 to write the payload data to cache memory 144B at the destination address specified in the Address field of the TLP header 300. In one embodiment, if the incoming TLP indicated that the write request was a certified memory-to-memory transfer type request, then the control logic 414 of bus bridge 124B also controls the PCI-Express interface 408 to return an acknowledgement packet to bus bridge 124A indicating that the data transfer was successful. Flow ends at block 712.

At decision block 714, the control logic 414 of bus bridge 124B determines whether the CPU memory 104B window 199B of RAID controller B 102B has been initialized, such as according to block 606 of FIG. 6. In one embodiment, the control logic 414 determines whether the window 199 has been initialized by comparing the present window information 197 values with the predetermined reset values, as described with respect to block 604 of FIG. 6 above. If the window 199B has been initialized, flow proceeds to block 718; otherwise, flow proceeds to block 716.

At block 716, the control logic 414 of bus bridge 124B flushes the payload data. In one embodiment, if the incoming TLP indicated that the write request was a certified memory-to-memory transfer type request, then the control logic 414 of bus bridge 124B also controls the PCI-Express interface 408 to return an acknowledgement packet to bus bridge 124A indicating that an error occurred because the window 199 had not been initialized. Flow ends at block 716.

At block 718, the translation logic 452 of FIG. 4 translates the destination address specified in the Address field of the TLP header 300 based on the window information 197. In the embodiment according to FIGS. 3 and 4, the translation logic 452 translates the destination address according to Equation (1) above. In the embodiment according to FIGS. 9 and 10, the translation logic 452 translates the destination address according to Equation (2) above. Flow proceeds to decision block 722.

At decision block 722, the control logic 414 of bus bridge 124B determines whether the payload data overflows the CPU memory 104B window 199B of RAID controller B 102B. That is, the control logic 414 determines whether the sum of the Length field of the TLP header 300 of FIG. 3 and the translated address generated at block 718, less one, is outside the window 199. If the payload data overflows the window 199, flow proceeds to block 724; otherwise, flow proceeds to block 726.

At block 724, the control logic 414 of bus bridge 124B flushes the payload data. In one embodiment, if the incoming TLP indicated that the write request was a certified memory-to-memory transfer type request, then the control logic 414 of bus bridge 124B also controls the PCI-Express interface 408 to return an acknowledgement packet to bus bridge 124A indicating that an error occurred because the window 199 had been overflowed. In one embodiment, the bus bridge 124B writes the portion of the payload data that is within the window 199 to the CPU memory 104B rather than flushing the data within the window, but flushes the remaining portion of the data. Flow ends at block 726.

At block 726, the control logic 414 of bus bridge 124B controls the CPU bus 158 interface 412 to write the payload data to CPU memory 104B at the address translated at block 718. In one embodiment, if the incoming TLP indicated that the write request was a certified memory-to-memory transfer type request, then the control logic 414 of bus bridge 124B also controls the PCI-Express interface 408 to return an acknowledgement packet to bus bridge 124A indicating that the data transfer was successful. Flow ends at block 726.

Figure 8:
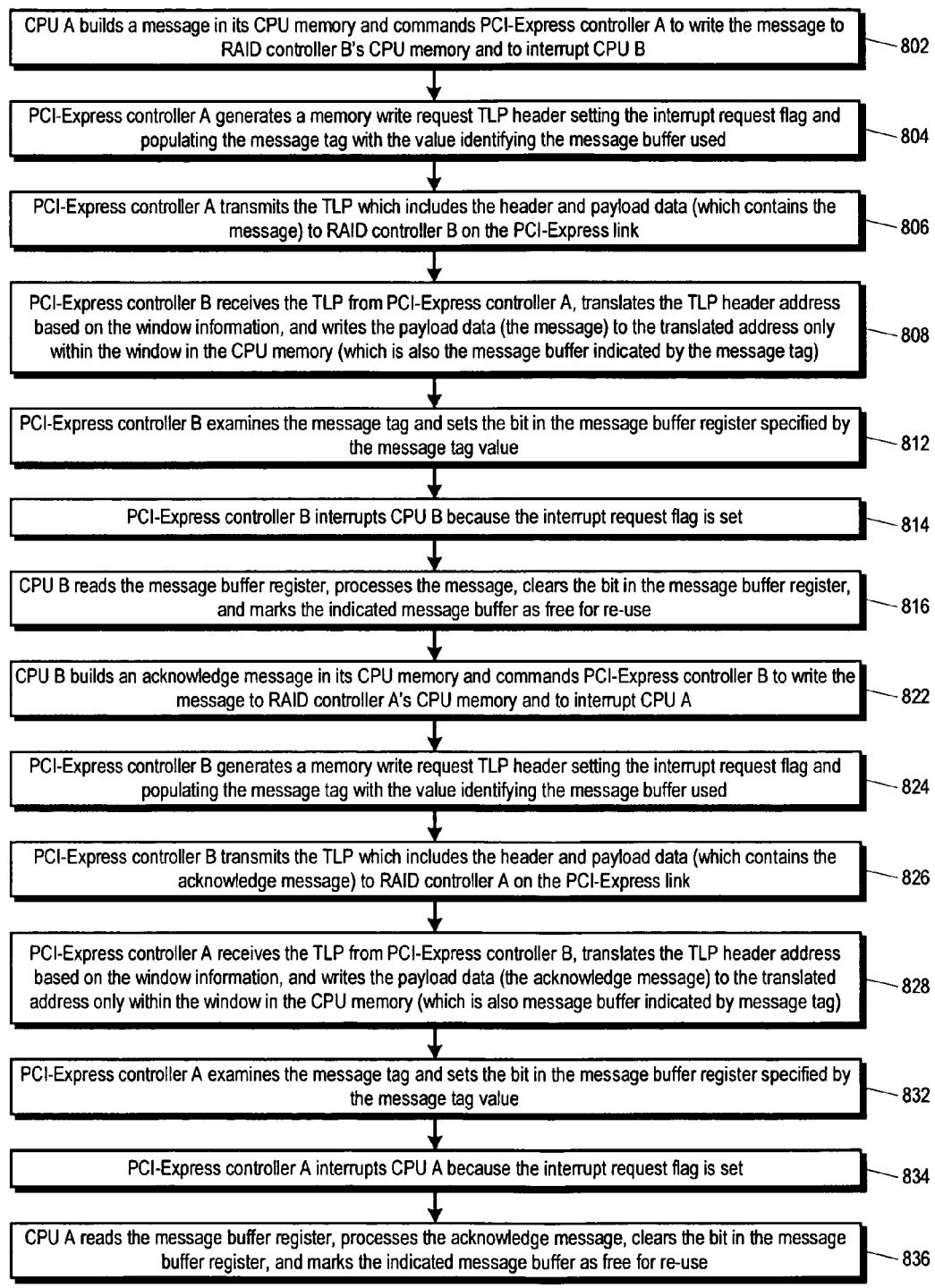
FIG. 8 is a flowchart illustrating operation of the system of FIG. 1 to send a simple message from the CPU memory of one RAID controller to the window of CPU memory of the other RAID controller according to the present invention.

Referring now to FIG. 8, a flowchart illustrating operation of the system 100 of FIG. 1 to send a simple message from the CPU memory 104A of RAID controller 102A to the window 199B of CPU memory 104B of RAID controller 102B according to the present invention is shown. The flowchart of FIG. 8 illustrates the process for transferring a message from the CPU memory 104 of one RAID controller 102 to the CPU memory 104 of the other RAID controller 102 and interrupting the CPU 108 of the receiving RAID controller 102 using a single memory write request TLP via the interrupt request flag 302. Flow begins at block 802.

At block 802, CPU 108A builds a message in one of its message buffers 112A in its CPU memory 104A and commands its bus bridge 124A via the DMAC 422 of FIG. 4 to write the message to a message buffer 112B in the CPU memory 104B of RAID controller B 102B via the PCI-Express link 118 and to interrupt the CPU 108B of RAID controller B 102B. In one embodiment, as described above, the CPU 108A commands the DMAC 422 by writing the address of a scatter/gather list to a DMAC 422 control register. The scatter/gather list includes an element that specifies the address and length of the message in the message buffer 112B. Flow proceeds to block 804.

At block 804, bus bridge 124A generates a modified PCI-Express memory write request TLP header 300 of FIG. 3 or TLP header 900 of FIG. 9 and sets the interrupt request flag 302 and populates the message tag 304 with a value identifying the message buffer 112 used to send and receive the message. In the embodiment of FIGS. 9 and 10, the bus bridge 124A also sets the CPU memory flag 906. In the embodiment of FIGS. 3 and 4, the bus bridge 124A populates the TLP header 300 Address field with the address of the message specified in the scatter/gather list element of block 802. In the embodiment of FIGS. 9 and 10, the bus bridge 124A populates the TLP header 900 Address field with the offset of the message within the window 199A of RAID controller A 102A, which the bus bridge 124A calculates by subtracting the subtrahend register 1046 value from the address of the message specified in the scatter/gather list element of block 802. Flow proceeds to block 806.

At block 806, bus bridge 124A transmits the memory write request TLP on the PCI-Express link 118 to RAID controller B 102B. The memory write request TLP includes the message built at block 802 as its payload data and includes the modified header 300 or 900 built at block 804. In one embodiment, bus bridge 124A interrupts CPU 108A when it has successfully transmitted a TLP. Flow proceeds to block 808.

At block 808, bus bridge 124B receives the memory write request TLP on the PCI-Express link 118 and selectively writes the payload data to its CPU memory 104B according to FIG. 7. That is, because in FIG. 8 the payload data is destined for a message buffer 112B in CPU memory 104B according to blocks 802 and 804, the bus bridge 124B writes the payload data to the message buffer 112B within the window 199B in CPU memory 104B, according to block 726 of FIG. 7. The translated address within CPU memory 104B according to block 718 of FIG. 7 is also the message buffer 112B indicated by the message tag 304 of the TLP header 300 or 900 built at block 804. Flow proceeds to block 812.

At block 812, bus bridge 124B examines the message tag 304 and sets the bit in the message buffer register 106B specified by the message tag 304 value. Flow proceeds to block 814.

At block 814, bus bridge 124B interrupts CPU 108B via interrupt signal 146B because the interrupt request flag 302 is set. Flow proceeds to block 816.

At block 816, CPU 108B reads the message buffer register 106B to determine which message buffers 112B contain a valid message and processes the message received at block 808. Additionally, CPU 108B clears the bit in the message buffer register 106B corresponding to the message buffer 112B in which the message was received, and marks the indicated message buffer 112B as free for re-use. The actions taken by CPU 108B to process the message depend upon the message type. In one embodiment, the simple messages include, but are not limited to, the messages described in Table 1 below. Flow proceeds to block 822.

Advantageously, as may be observed from FIG. 8, the fact that the message is transferred into the receiving RAID controller 102 CPU memory 104, rather than its cache memory 144, enables the receiving CPU 108 to more efficiently access and process the received message than if the message had been written to the receiving RAID controller 102 cache memory 144, since the CPU 108 more efficiently accesses the CPU memory 104 than the cache memory 144. Additionally, the interrupt request flag 302 is employed to accomplish both the safe transfer of a message directly into CPU memory 104 and an interrupt request in a single memory write request TLP transmission over the PCI-Express link 118, which is less than the two TLP packets that would have to be transmitted over the PCI-Express link 118 using standard PCI-Express protocol, i.e., one TLP packet in order to transfer the message and a second TLP packet to transmit a PCI-Express message signaled interrupt (MSI). Thus, the method of the present invention makes more efficient use of precious resources, namely PCI-Express link 118 bandwidth and CPU 108 bandwidth. Additionally, the interrupt request flag 302 is employed to accomplish the transfer of both a message and an interrupt request in a single memory write request TLP trans-

TABLE 1

| | |
|---|---|
| CONTAINER_CLEAN | causes RAID controller receiving the message to synchronize its cache memory with the storage devices, i.e., to flush dirty cache data to the storage devices |
| HEARTBEAT | indicates to the receiving RAID controller that the sending RAID controller is functioning properly |
| LUN_INFO | used to exchange information regarding which RAID logical units are presented between controllers |
| RECONFIGURE | causes the receiving RAID controller to refresh the configuration data |
| LOCKMGR_GRANT/LOCKMGR_REQUEST/ LOCKMGR_DENY_REQUEST | used to enable an inter-controller distributed lock manager to gain access to a shared resource |
| PAUSE_IO | temporarily pauses I/O operations with the storage devices |
| PAUSE_IO_REPLY | acknowledge that a PAUSE_IO message was received |
| UNPAUSE_IO | resume I/O operations with the storage devices |
| UNPAUSE_IO_REPLY | acknowledge that an UNPAUSE_IO message was received |
| START_FAILBACK | causes RAID controller receiving the message to begin failback processing |
| BOOT_HANDSHAKE | inter-controller message used during initialization to discover basic information about the other RAID controller, e.g., world-wide names, memory size, firmware level, etc. |
| BOOT_HANDSHAKE_REPLY | used with BOOT_HANDSHAKE to send reply data to the other RAID controller |
| ASYNCUPDATE_NOTIFICATION | used to notify the other RAID controller of I/O interface events |
| SHUTDOWN_REBOOT | causes RAID controller receiving the message to shutdown and reboot |
| SHUTDOWN_REBOOT_REPLY | acknowledge that a SHUTDOWN_REBOOT message was received |
| RAID_SEND_XFER_COMPLETE | used to invalidate RAID Data Logs on the other RAID controller |
| GENERIC_SEND_DATA | used to synchronize time between the RAID controllers and to send a pointer to mirrored configuration data (the actual mirrored configuration data is sent via a non-cache data type message) |

At blocks 822 through 836, CPU 108B and bus bridge 124B send bus bridge 124A and CPU 108A an acknowledgment message via the PCI-Express link 118 to acknowledge receipt of the simple message in a similar fashion in which CPU 108A sent the simple message at blocks 802 through 816. The interrupt request flag 302 and message tag 304 are used at block 822 through 836 in a manner similar to their use at blocks 802 through 816. Flow ends at block 836.

mission over the PCI-Express link 118, which eliminates the need for dedicated interrupt request lines between the two processors 108.

Although the safe message transfer directly into CPU memory 104 has been described in FIG. 8 with respect to the simple messages listed in Table 1 above, the safe transfer directly into CPU memory 104 may also be performed to transfer other types of messages, such as a SEND CACHE DATA message (excluding the write cache data, which is written to the cache memory 144) and a non-cache data type message (for example, to send relatively large amounts of configuration data or RAID data logs between the CPU memories 104 of the RAID controllers 102), which are described in detail in U.S. patent application Ser. No. 11/178,727.

Embodiments have been described herein in which the RAID controllers 102 each include a separate CPU memory 104 and cache memory 144, as shown in the embodiment of FIG. 1. However, other embodiments are contemplated in which the RAID controllers 102 each include a single, unified memory that serves the functions of both the CPU memory 104 and cache memory 144 in the embodiment FIG. 1. In particular, the single unified memory contains program instructions and data to be fetched and executed by the CPU 108; and, the single unified memory also buffers, or caches, user data transferred between the disk arrays 116 and the host computers 114. Embodiments having a single unified memory are described below with respect to FIGS. 11 through 14.

Figure 11:
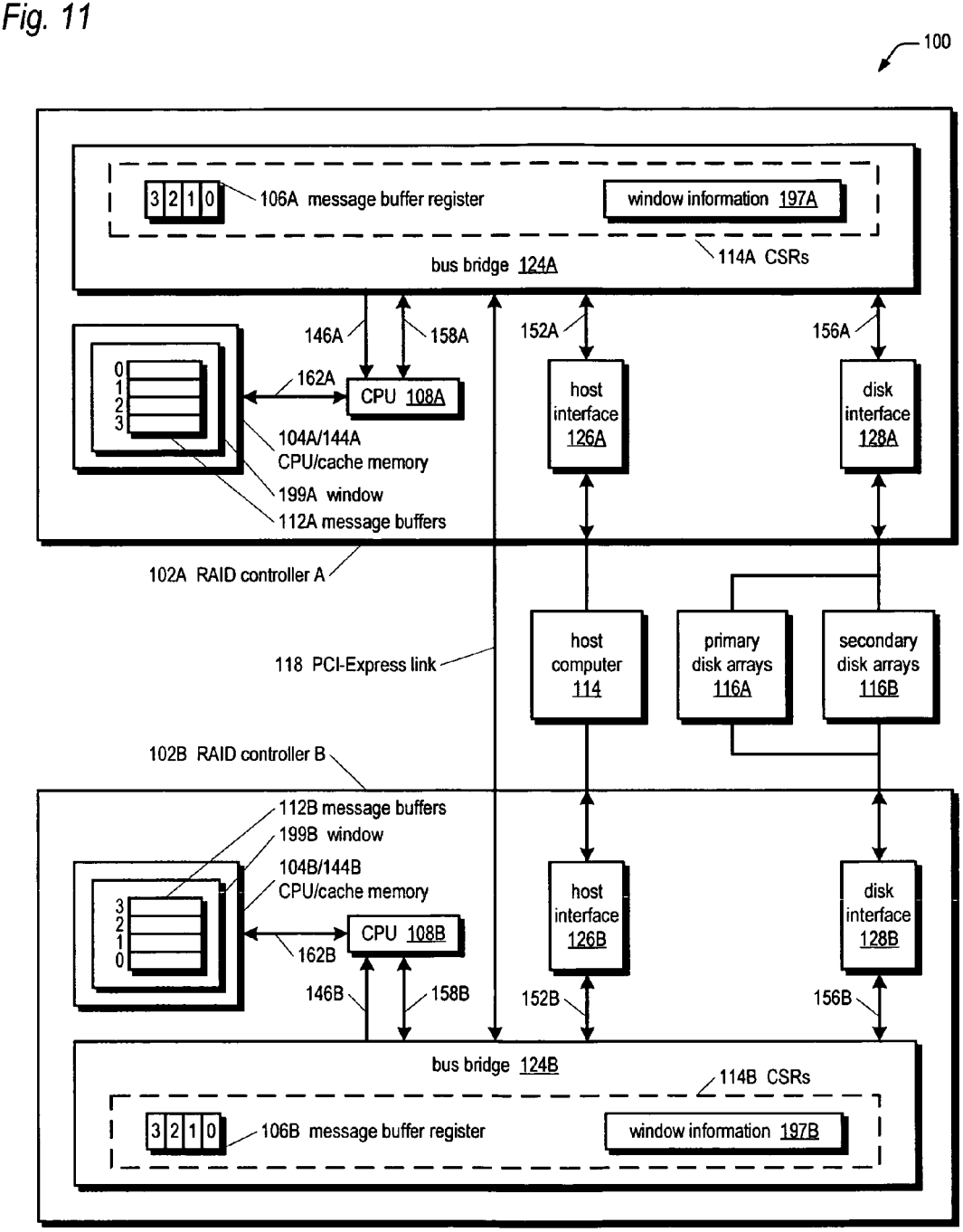
FIG. 11 is a block diagram illustrating an active-active redundant fault-tolerant RAID subsystem according to an alternate embodiment of the present invention.

Referring now to FIG. 11, a block diagram illustrating an active-active redundant fault-tolerant RAID subsystem 100 according to an alternate embodiment of the present invention is shown. FIG. 11 is similar to FIG. 1; however, the RAID controllers 102 of FIG. 11 have a unified CPU memory 104/cache memory 144 coupled to the CPU complex 108 via bus 162, rather than having a separate cache memory 144 coupled to the bus bridge 124 as in FIG. 1. The unified CPU memory 104/cache memory 144 serves the combined functions of the distinct CPU memory 104 and cache memory 144 of FIG. 1.

Figure 12:
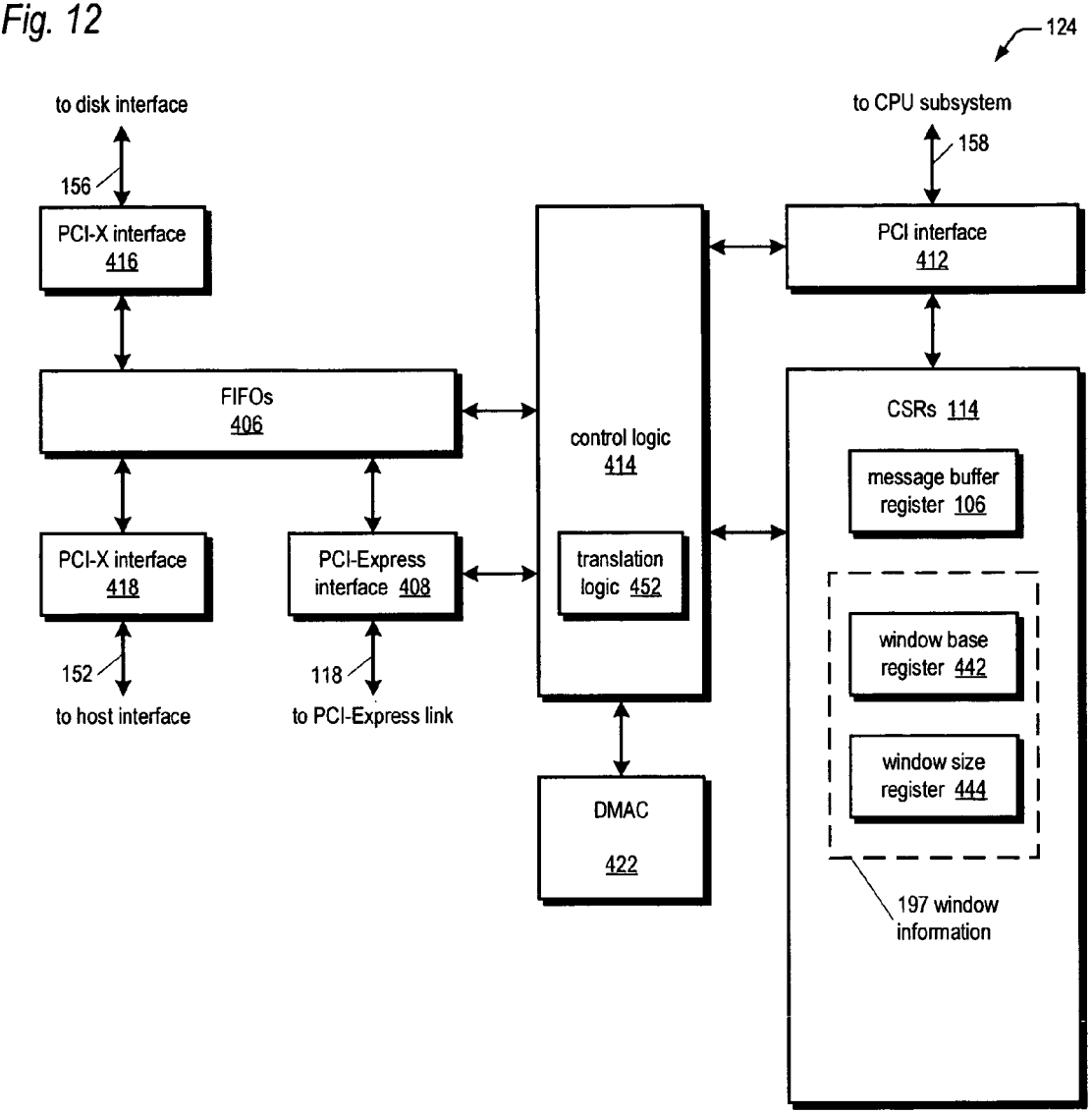
FIG. 12 is a block diagram illustrating in more detail the bus bridge of FIG. 11 according to an alternate embodiment of the present invention.

Referring now to FIG. 12, a block diagram illustrating in more detail the bus bridge 124 of FIG. 11 according to an alternate embodiment of the present invention is shown. The bus bridge 124 of FIG. 12 is similar to the bus bridge 124 of FIG. 4; however, the bus bridge 124 of FIG. 12 does not include the memory interface 404, since the cache memory 144 memory of FIG. 11 is unified with the CPU memory 104, which is coupled to the bus bridge 124 via bus 158.

Figure 13:
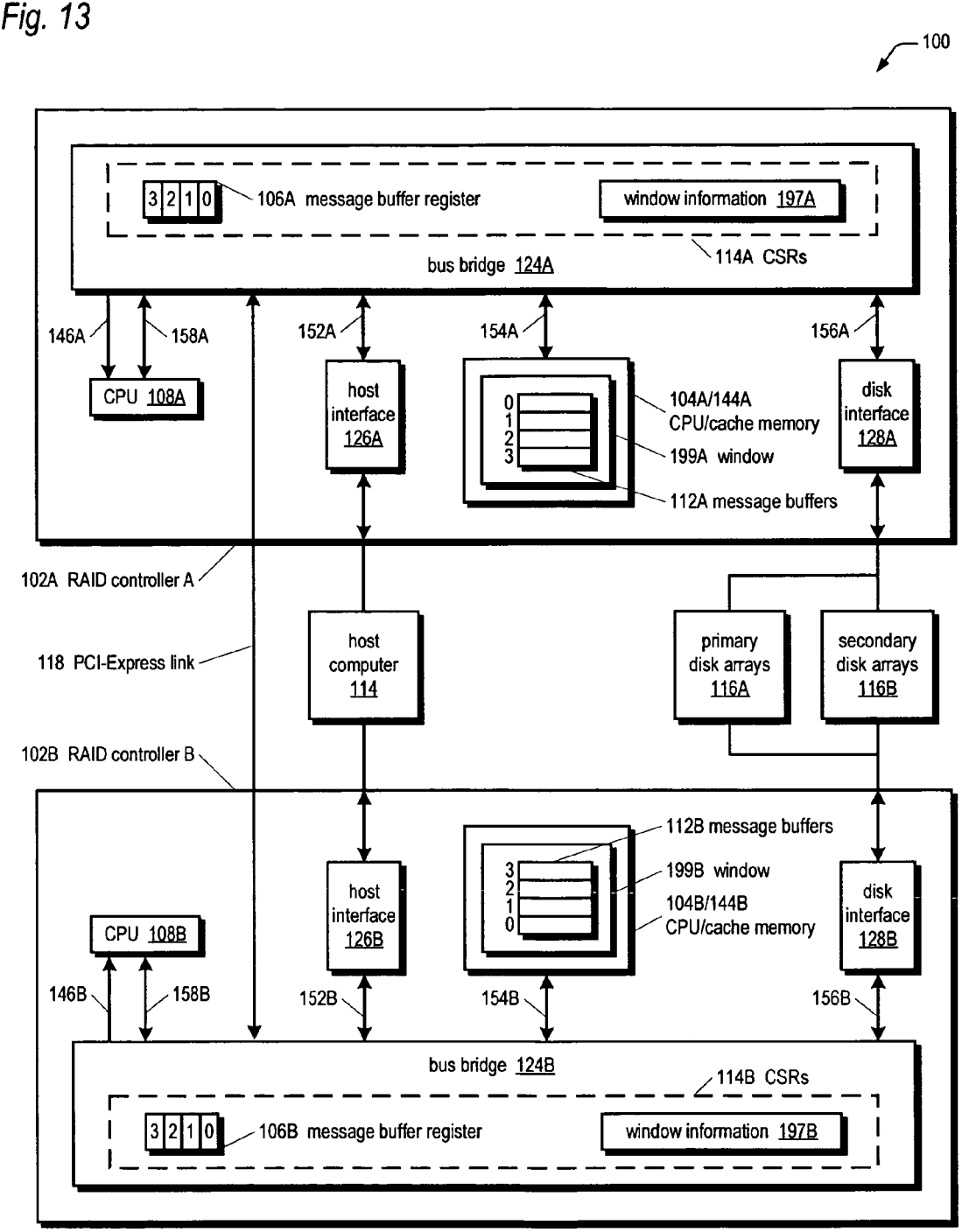
FIG. 13 is a block diagram illustrating an active-active redundant fault-tolerant RAID subsystem according to an alternate embodiment of the present invention.

Referring now to FIG. 13, a block diagram illustrating an active-active redundant fault-tolerant RAID subsystem 100 according to an alternate embodiment of the present invention is shown. FIG. 13 is similar to FIG. 1; however, the RAID controllers 102 of FIG. 13 have a unified CPU memory 104/cache memory 144 coupled to the bus bridge 124 via bus 154, rather than having a separate cache memory 144 coupled to the CPU complex 108 as in FIG. 1. The unified CPU memory 104/cache memory 144 serves the combined functions of the distinct CPU memory 104 and cache memory 144 of FIG. 1.

Figure 14:
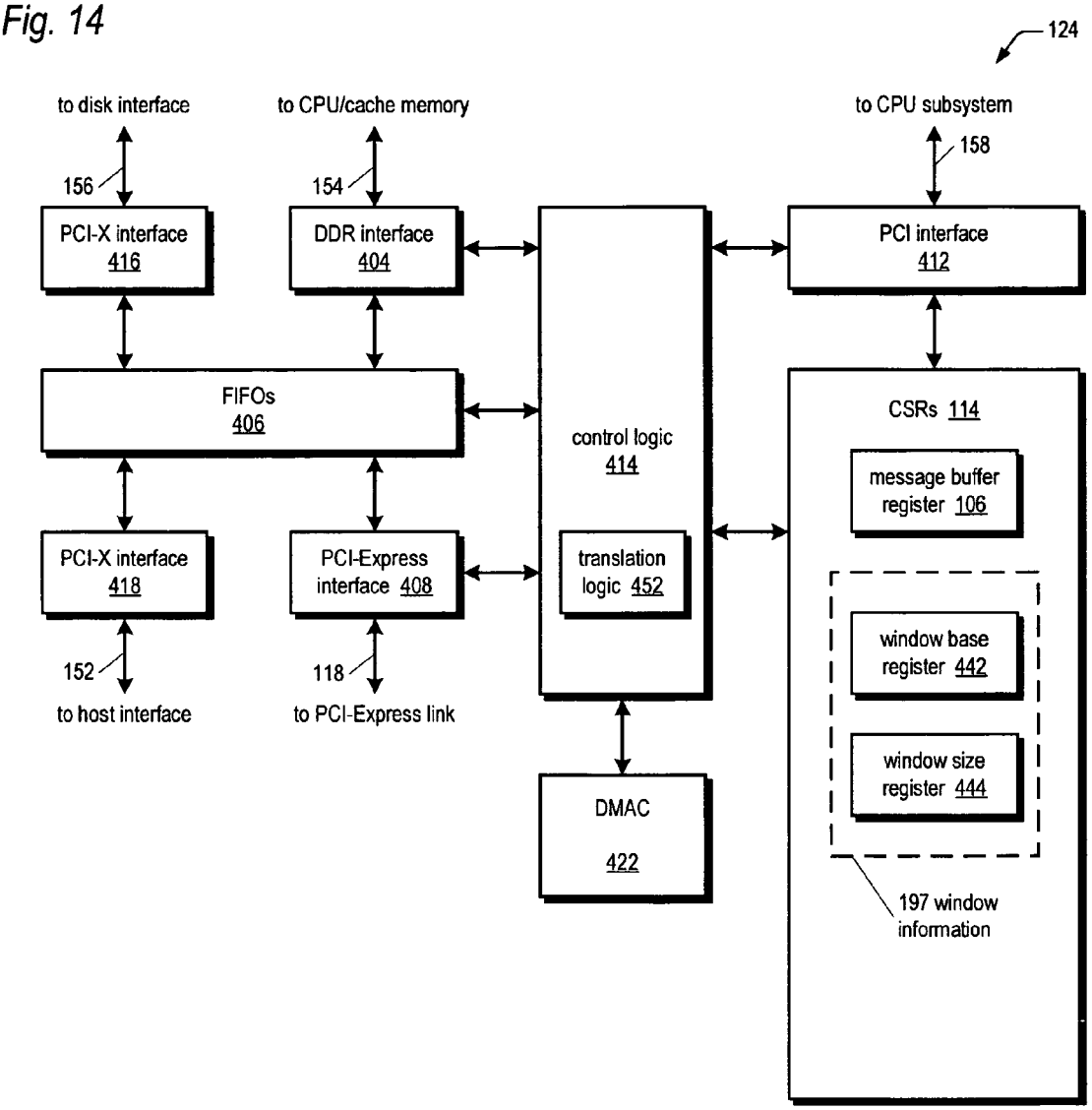
FIG. 14 is a block diagram illustrating in more detail the bus bridge of FIG. 13 according to an alternate embodiment of the present invention.

Referring now to FIG. 14, a block diagram illustrating in more detail the bus bridge 124 of FIG. 13 according to an alternate embodiment of the present invention is shown. The bus bridge 124 of FIG. 14 is similar to the bus bridge 124 of FIG. 4; however, as shown, the memory interface 404 couples the bus bridge 124 via bus 154 to the unified CPU memory 104/cache memory 144. It is noted that although FIGS. 12 and 14 do not include the subtrahend register 1046 of FIG. 10, embodiments are also contemplated which employ the subtrahend register 1046.

The embodiments of FIG. 11 through 14 operate similarly to the operation described in FIGS. 5 through 8. Advantageously, the embodiments of FIGS. 11 through 14 also enjoy the benefits of having a window 199 within the unified CPU memory 104/cache memory 144 programmable by the local CPU 108 within which direct transfers by the other RAID controller 102 are restricted by the bus bridge 124. In particular, the programmable window 199 greatly reduces the danger that a software or hardware failure on the sending RAID controller 102 may cause it to write to an undesirable location within the receiving unified CPU memory 104/cache memory 144, such as overwriting the programs being executed by the receiving CPU, causing the receiving RAID controller 102 to also fail. Further, the fact that the window 199 is programmable enables the local CPU 108 to dynamically specify the location and size of the window 199 without requiring the sending CPU 108 to have this knowledge, thus removing the need for the two RAID controllers 102 to negotiate for a location within the unified CPU memory 104/cache memory 144, such as for message buffers, and enabling the two RAID controllers 102 to execute different software versions, and in particular, enabling a software upgrade of one RAID controller 102 while the other RAID controller 102 continues to operate and provide data availability.

Although the present invention and its objects, features, and advantages have been described in detail, other embodiments are encompassed by the invention. For example, although embodiments have been described in which the data transfer to the destination processor memory is a message followed by an interrupt to the destination processor, other embodiments are contemplated in which no interrupt is generated to the destination processor. For example, the destination processor may poll a known location in its processor RAM to detect that the source processor has written a message thereto. Furthermore, the type of message or data that may be safely transferred to the processor RAM is not limited to the particular embodiments described herein; rather, the system and method described herein for safely transferring messages directly into CPU memory 104 may be used to transfer any type of data. Still further, although embodiments have been described in which the sending CPU programs a DMAC within the sending bus bridge to read the data from the sending CPU memory and transmit the data in a PCI-Express memory write request TLP on the link destined for the receiving CPU memory, other embodiments are contemplated in which the sending CPU executes a store instruction that causes a write transaction on the local bus to the bus bridge; in response, the bus bridge transmits a PCI-Express memory write request TLP on the link that includes the store data in its data payload. Furthermore, although particular embodiments for specifying the window information and translating the CPU memory destination address have been described, other embodiments are contemplated to accommodate the desired application. Additionally, although embodiments have been described in which the safe direct transfer of messages into the CPU memory within the window defined by the local CPU is employed in conjunction with the automatic interrupting of the receiving CPU via the interrupt request flag, the safe direct transfer of messages into the CPU memory within the window may be employed independently, i.e., without also employing the automatic interrupting of the receiving CPU via the interrupt request flag.

Still further, although embodiments have been described in which the CPU memory flag 906 bit occupies bit 58 in the address field of the TLP header 900, other bits of the address field may be used for the CPU memory flag 906. Additionally, although embodiments are shown in which the TLP has a 4 double word header with data format, address bits in a 3 double word header with data format TLP may be used for the CPU memory flag 906 if the amount of cache memory to be addressed is small enough to be addressed by 32 bits less the number used for the CPU memory flag 906. What is important is that the bit used for the CPU memory flag 906 bit in the address field that is not needed for addressing memory in the receiving RAID controller and that the bit chosen be predetermined so that the PCI-Express controller may be configured to interpret the predetermined bit as the CPU memory flag 906 bit.

Furthermore, other embodiments are contemplated in which the CPU memory flag 906 bit is located in an unneeded bit of fields of the TLP header other than the address field. For example, one or more of the reserved fields in the TLP header could be used for the CPU memory flag 906 bit. For another example, the system designer could decide not to support data poisoning and utilize the EP bit in the TLP header as the CPU memory flag 906. Similarly, the system designer could decide not to support TLP digests and utilize the TD bit in the TLP header as the CPU memory flag 906. Similarly, the system designer could decide not to support differentiated service classes or to support only a subset thereof and utilize the surplus TC bits in the TLP header as the CPU memory flag 906. Similarly, the system designer could decide not to support relaxed ordering and/or hardware coherency management and utilize one or both of the attribute bits in the TLP header as the CPU memory flag 906. Similarly, the system designer could decide to require data transfers to be located on dword boundaries and utilize the bits in one or both of the byte enable fields of the TLP header as the CPU memory flag 906. Similarly, the system designer could decide to support less than the maximum number of outstanding requests and utilize unneeded bits in the tag field and/or function number field of the transaction ID of the TLP header as the CPU memory flag 906. Again, what is important is that the bits used for the CPU memory flag 906 are bits that are not needed for standard PCI-Express functions and that the bits chosen be predetermined so that the PCI-Express controller may be configured to interpret the predetermined bits as the CPU memory flag 906.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

I claim:

1. A fault-tolerant mass storage system, comprising:
   first and second RAID controllers, coupled for communication via a PCI-Express link, each comprising:
   a bus bridge, coupled to said link and to first and second buses;
   a cache memory, coupled to said first bus, configured to cache user data for storage on disk drives controlled by said controllers; and
   a CPU, and a CPU memory coupled to said CPU, each coupled to said second bus, wherein said CPU is configured to fetch and execute program instructions from said CPU memory, wherein said CPU is configured to program said bus bridge with window information defining a window of locations within said CPU memory, wherein said window comprises less than an entirety of said CPU memory;
   wherein said bus bridge is configured to receive data on said link from the other of said first and second RAID controllers, to write said data to said CPU memory if destined for said CPU memory, but only within said window and nowhere else within said CPU memory, and to write said data to said cache memory if destined for said cache memory, wherein said bus bridge is configured to refrain from writing said data to said CPU memory outside of said window even if said bus bridge determines that a portion of said data is destined for said CPU memory within said window.

2. The system of claim 1, wherein said bus bridge further comprises:
   at least one control register, programmable by said CPU with said window information specifying said window of locations within said CPU memory.

3. The system of claim 2, wherein said bus bridge is configured to reset to a predetermined reset value of said window information in said control register until programmed by said CPU, wherein if said bus bridge receives said data prior to said CPU programming a value other than said reset value into said control register, said bus bridge is configured to refrain from writing said data to said CPU memory even if said bus bridge determines that said data is destined for said CPU memory.

4. The system of claim 1, wherein said bus bridge is configured to receive a PCI-Express memory write request transaction layer packet (TLP) on said link from the other RAID controller, said TLP including a payload field containing said data, wherein said bus bridge is configured to determine from a header of said TLP whether said data is destined for said CPU memory, and to determine from said header whether said data is destined for said cache memory.

5. The system of claim 4, wherein said header includes an address field for storing a first address, wherein if said data is destined for said CPU memory, said bus bridge is configured to translate said first address using said window information into a second address that is within said window, and to write said data to said CPU memory at said second address only within said window.

6. The system of claim 5, wherein if said data is destined for said cache memory, said bus bridge is configured to write said data to said cache memory at said first address stored in said address field.

7. The system of claim 6, wherein said cache memory occupies a predetermined address range within a memory address space defined by said address field, wherein said bus bridge is configured to determine whether said data is destined for said cache memory by determining whether said first address is within said cache memory address range.

8. The system of claim 5, wherein said CPU memory occupies a predetermined address range within a memory address space defined by said address field, wherein said bus bridge is configured to determine whether said data is destined for said CPU memory by determining whether said first address is within said CPU memory address range.

9. The system of claim 5, wherein said window information comprises upper address bits programmed into said bus bridge by said CPU, wherein said bus bridge is configured to translate said first address into said second address by replacing a portion of upper address bits of said first address with said upper address bits of said window information.

10. The system of claim 5, wherein said window information comprises a base address of said window, wherein said bus bridge is configured to translate said first address into said second address by adding said base address to said first address.

11. The system of claim 10, wherein said bus bridge further comprises:
    a subtrahend, programmable by said CPU;
    wherein said bus bridge on the other of the first and second RAID controllers transmitting said TLP on said link is configured to subtract said subtrahend from a source address of said data in said CPU memory of said transmitting RAID controller to generate said first address, wherein said first address comprises an offset into said window.

12. The system of claim 10, wherein said bus bridge is configured to determine whether said data is destined for said CPU memory by determining whether a predetermined bit of the TLP header has a predetermined value.

13. The system of claim 12, wherein the PCI-Express memory write request TLP has a 4 double word header with data format, wherein said predetermined bit of the TLP header is one of bits 63 through 32 of the address field.

14. The system of claim 5, wherein said header includes a length field for storing a length of said data, wherein if said length specifies one or more locations outside said window, said bus bridge is configured to refrain from writing said data to said CPU memory outside said window.

15. The system of claim 1, wherein said window information specifies a size of said window.

16. The system of claim 1, wherein said window information comprises a base address of said window within said CPU memory.

17. The system of claim 1, wherein said first and second RAID controllers operate as an active-active redundant pair.

18. The system of claim 1, wherein said data destined for said CPU memory comprises a message from said first RAID controller to said second RAID controller for managing configuration of disk arrays coupled to and controlled by said first and second RAID controllers.

19. The system of claim 1, wherein said data destined for said CPU memory comprises a message from said first RAID controller to said second RAID controller for managing input/output operations to disk arrays coupled to and controlled by said first and second RAID controllers.

20. The system of claim 1, wherein said data destined for said CPU memory comprises a message from said first RAID controller to said second RAID controller for managing configuration of said first and second RAID controllers.

21. The system of claim 1, wherein said data destined for said CPU memory comprises a message from said first RAID controller to said second RAID controller for managing said cache memory of said second RAID controller.

22. The system of claim 1, wherein said bus bridge is further coupled to a third bus, for coupling to a disk interface, wherein said disk interface is configured to control disk arrays controlled by said first and second RAID controllers.

23. The system of claim 22, wherein said bus bridge is further coupled to a fourth bus, for coupling to a host interface, wherein said host interface is configured to communicate with host computers coupled to said first and second RAID controllers.

24. The system of claim 1, wherein each of said first and second RAID controllers further comprises:
a second bus bridge, coupled to said second bus, and to said CPU and said CPU memory, wherein said CPU fetches and executes said program instructions from said CPU memory via said second bus bridge, wherein said bus bridge writes said data to said window within said CPU memory via said second bus bridge.

25. The system of claim 1, wherein said bus bridge comprises a direct memory access controller (DMAC), wherein said CPU on the other of the first and second RAID controllers transmitting said TLP on said link is configured to program said DMAC to transfer said data from said CPU memory of said transmitting RAID controller on said link to said bus bridge of said receiving RAID controller for writing into said CPU memory within said window.

26. A method for reliably transferring data between first and second RAID controllers via a PCI-Express link in a fault-tolerant mass storage system, the first RAID controller having a first bus bridge coupled to the link, to a first cache memory for caching user data for storage on disk drives controlled by the first RAID controller, to a first CPU, and to a first CPU memory for storing program instructions fetched and executed by the first CPU, the second RAID controller having a second bus bridge coupled to the link, to a second cache memory for caching user data for storage on disk drives controlled by the second RAID controller, to a second CPU, and to a second CPU memory for storing program instructions fetched and executed by the second CPU, the method comprising:
programming, by the first CPU, the first bus bridge with window information defining a window of locations within the first CPU memory, wherein the window comprises less than an entirety of the first CPU memory;
receiving, by the first bus bridge, data on the link from the second bus bridge;
writing, by the first bus bridge, the data to the first CPU memory if the data is destined for the first CPU memory, but only within the window and nowhere else within the first CPU memory;
refraining, by the first bus bridge, from writing the data to the first CPU memory outside of the window even if the first bus bridge determines that a portion of the data is destined for the first CPU memory within the window; and
writing, by the first bus bridge, the data to the first cache memory if the data is destined for the first cache memory.

27. The method of claim 26, further comprising:
programming, by the first CPU, at least one control register of the first bus bridge with the window information specifying the window of locations within the first CPU memory.

28. The method of claim 27, further comprising:
resetting, by the first bus bridge, to a predetermined reset value of the window information in the control register until programmed by the first CPU;
determining, by the first bus bridge, whether the data has been received prior to the first CPU programming a value other than the reset value into the control register; and
refraining, by the first bus bridge, from writing the data to the first CPU memory, if the data has been received prior to the first CPU programming a value other than the reset value into the control register, even if the first bus bridge determines that the data is destined for the first CPU memory.

29. The method of claim 26, further comprising:
receiving, by the first bus bridge, a PCI-Express memory write request transaction layer packet (TLP) on the link from the second bus bridge, the TLP including a payload field containing the data;
determining, by the first bus bridge, from a header of the TLP whether the data is destined for the first CPU memory; and
determining, by the first bus bridge, from the header whether the data is destined for the first cache memory.

30. The method of claim 29, wherein the header includes an address field for storing a first address, the method further comprising:
if the data is destined for the first CPU memory:
translating, by the first bus bridge, the first address using the window information into a second address that is within the window; and
writing, by the first bus bridge, the data to the first CPU memory at the second address only within the window.

31. The method of claim 30, further comprising:
writing, by the first bus bridge, the data to the first cache memory at the first address stored in the address field, if the data is destined for the first cache memory.

32. The method of claim 31, wherein the first cache memory occupies a predetermined address range within a memory address space defined by the address field, wherein the first bus bridge determining whether the data is destined for the first cache memory comprises determining whether the first address is within the first cache memory address range.

33. The method of claim 30, wherein the first CPU memory occupies a predetermined address range within a memory address space defined by the address field, wherein the first bus bridge determining whether the data is destined for the first CPU memory comprises determining whether the first address is within the first CPU memory address range.

34. The method of claim 30, wherein the window information comprises upper address bits programmed into the first bus bridge by the first CPU, wherein the first bus bridge translating the first address into the second address comprises replacing a portion of upper address bits of the first address with the upper address bits of the window information.

35. The method of claim 30, wherein the window information comprises a base address of the window, wherein the first bus bridge translating the first address into the second address comprises adding the base address to the first address.

36. The method of claim 35, further comprising:
programming, by the second CPU, a subtrahend into the second bus bridge;
subtracting, by the second bus bridge, the subtrahend from a source address of the data in the second CPU memory to generate the first address, wherein the first address comprises an offset into the window.

37. The method of claim 35, wherein the first bus bridge determining whether the data is destined for the first CPU memory comprises determining whether a predetermined bit of the TLP header has a predetermined value.

38. The method of claim 30, wherein the header includes a length field for storing a length of the data, the method further comprising:
refraining, by the first bus bridge, from writing the data to the first CPU memory outside the window, if the length specifies one or more locations outside the window.

39. The method of claim 26, wherein the first and second bus bridges comprise a direct memory access controller (DMAC), the method further comprising:
programming, by the second CPU, the second DMAC to transfer the data from the second CPU memory of the second RAID controller on the link to the first bus bridge for writing into the first CPU memory within the window.

40. A bus bridge, for instantiation on each of two redundant array of inexpensive disks (RAID) controllers coupled for communication on a PCI-Express link, the bus bridge comprising:
a PCI-Express interface, for coupling to said link, wherein said PCI-Express interface is configured to receive data on said link from said PCI-Express interface of the other RAID controller;
a memory bus interface, for coupling to a cache memory, configured to cache user data for storage on disk drives controlled by said controllers;
a local bus interface, for coupling to a CPU and to a CPU memory from which said CPU fetches and executes program instructions;
at least one control register, programmable by said CPU with window information defining a window of locations within said CPU memory, said window comprising less than an entirety of said CPU memory; and
control logic, coupled to said interfaces, wherein said control logic is configured to determine whether said received data is destined for said CPU memory, and if so, to control said local bus interface to write said data to said CPU memory, but only within said window and nowhere else within said CPU memory, and to determine whether said data is destined for said cache memory, and if so, to control the memory bus interface to write said data to said cache memory, wherein said control logic is configured to refrain from controlling said memory bus interface to write said data to said CPU memory outside of said window even if said control logic determines that a portion of said data is destined for said CPU memory within said window.

41. The bus bridge of claim 40, wherein said bus bridge further comprises:
at least one control register, programmable by said CPU with said window information specifying said window of locations within said CPU memory.

42. The bus bridge of claim 41, further configured to reset to a predetermined reset value of said window information in said control register until programmed by said CPU, wherein if said bus bridge receives said data prior to said CPU programming a value other than said reset value into said control register, said control logic is configured to refrain from writing said data to said CPU memory even if said control logic determines that said data is destined for said CPU memory.

43. The bus bridge of claim 40, wherein said PCI-Express interface is configured to receive a PCI-Express memory write request transaction layer packet (TLP) on said link from the other RAID controller, said TLP including a payload field containing said data, wherein said control logic is configured to determine from a header of said TLP whether said data is destined for said CPU memory, and to determine from said header whether said data is destined for said cache memory.

44. The bus bridge of claim 43, wherein said header includes an address field for storing a first address, wherein if said control logic determines said data is destined for said CPU memory, said control logic translates said first address using said window information into a second address that is within said window, and controls said memory bus interface to write said data to said CPU memory at said second address only within said window.

45. The bus bridge of claim 44, wherein if said control logic determines said data is destined for said cache memory, said control logic controls said memory bus interface to write said data to said cache memory at said first address stored in said address field.

46. The bus bridge of claim 45, wherein said cache memory occupies a predetermined address range within a memory address space defined by said address field, wherein said control logic is configured to determine whether said data is destined for said cache memory by determining whether said first address is within said cache memory address range.

47. The bus bridge of claim 44, wherein said CPU memory occupies a predetermined address range within a memory address space defined by said address field, wherein said control logic is configured to determine whether said data is destined for said CPU memory by determining whether said first address is within said CPU memory address range.

48. The bus bridge of claim 44, wherein said window information comprises upper address bits programmed into said bus bridge by said CPU, wherein said control logic is configured to translate said first address into said second address by replacing a portion of upper address bits of said first address with said upper address bits of said window information.

49. The bus bridge of claim 44, wherein said window information comprises a base address of said window, wherein said control logic is configured to translate said first address into said second address by adding said base address to said first address.

50. The bus bridge of claim 49, wherein said bus bridge further comprises:
a subtrahend, programmable by said CPU;
wherein said control logic of the RAID controller transmitting the TLP on the link is configured to subtract said subtrahend from a source address of said data in said CPU memory of the other RAID controller to generate said first address, wherein said first address comprises an offset into said window.

51. The bus bridge of claim 49, wherein said control logic is configured to determine whether said data is destined for said CPU memory by determining whether a predetermined bit of the TLP header has a predetermined value.

52. The bus bridge of claim 44, wherein said header includes a length field for storing a length of said data, wherein if said control logic determines said length specifies one or more locations outside said window, said control logic is configured to refrain from controlling said memory bus interface to write said data to said CPU memory outside said window.

53. The bus bridge of claim 40, wherein said window information specifies a size of said window.

54. The bus bridge of claim 40, wherein said window information comprises a base address of said window within said CPU memory.

55. The bus bridge of claim 40, further comprising:
a second local bus interface, for coupling to a disk interface, wherein said disk interface is configured to control disk arrays controlled by said RAID controllers.

56. The bus bridge of claim 55, further comprising:
a third local bus interface, for coupling to a host interface, wherein said host interface is configured to communicate with host computers coupled to said RAID controllers.

57. The bus bridge of claim 40, further comprising:
a direct memory access controller (DMAC), configured for programming by said CPU to transfer said data from said CPU memory on said link to said bus bridge.

58. The bus bridge of claim 40, further comprising:
a first-in-first-out (FIFO) memory, coupling said memory interface and said local bus interface, for buffering said data.

59. The bus bridge of claim 40, wherein said local bus interface comprises a PCI bus interface.

60. The bus bridge of claim 40, wherein said local bus interface comprises a PCI-X bus interface.

61. A fault-tolerant mass storage system, comprising:
first and second RAID controllers, coupled for communication via a PCI-Express link, each comprising:
a bus bridge, coupled to said link;
a CPU memory, coupled to said bus bridge, configured to store program instructions and to cache user data for storage on disk drives controlled by said controllers; and
a CPU, coupled to said CPU memory and to said bus bridge, configured to fetch and execute said program instructions from said CPU memory, to control caching of said user data in said CPU memory, and to program said bus bridge with window information defining a window of locations within said CPU memory, wherein said window comprises less than an entirety of said CPU memory;
wherein said bus bridge is configured to receive data on said link from the other of said first and second RAID controllers, and to write said data to said CPU memory, but only within said window and nowhere else within said CPU memory, wherein said bus bridge is configured to refrain from writing said data to said CPU memory outside of said window even if said bus bridge determines that a portion of said data is destined for said CPU memory within said window.

62. A method for reliably transferring data between first and second RAID controllers via a PCI-Express link in a fault-tolerant mass storage system, each of the RAID controllers having a bus bridge coupled to the link, to a CPU, and to a CPU memory for storing program instructions fetched and executed by the CPU and for caching user data for storage on disk drives controlled by the RAID controllers, the method comprising:
programming, by the first CPU, the first bus bridge with window information defining a window of locations within the first CPU memory, wherein the window comprises less than an entirety of the CPU memory;
receiving, by the first bus bridge, data on the link from the second bus bridge;
writing, by the first bus bridge, the data to the first CPU memory, but only within the window and nowhere else within the first CPU memory; and
refraining, by the first bus bridge, from writing the data to the first CPU memory outside of the window even if the first bus bridge determines that a portion of the data is destined for the first CPU memory within the window.

63. A bus bridge, for instantiation on each of two redundant array of inexpensive disks (RAID) controllers coupled for communication on a PCI-Express link, the bus bridge comprising:
a PCI-Express interface, for coupling to said link, wherein said PCI-Express interface is configured to receive data on said link from said PCI-Express interface of the other RAID controller;
a local bus interface, for coupling to a CPU and to a CPU memory from which said CPU fetches and executes program instructions and which caches user data for storage on disk drives controlled by the controllers;
at least one control register, programmable by said CPU with window information defining a window of locations within said CPU memory, said window comprising less than an entirety of said CPU memory; and
control logic, coupled to said interfaces, wherein said control logic is configured to control said local bus interface to write said data to said CPU memory, but only within said window and nowhere else within said CPU memory, wherein said control logic is configured to refrain from controlling said local bus interface to write said data to said CPU memory outside of said window even if said control logic determines that a portion of said data is destined for said CPU memory within said window.

64. A bus bridge, for instantiation on each of two redundant array of inexpensive disks (RAID) controllers coupled for communication on a PCI-Express link, the bus bridge comprising:
a PCI-Express interface, for coupling to said link, wherein said PCI-Express interface is configured to receive data on said link from said PCI-Express interface of the other RAID controller;

a first bus interface, for coupling to a CPU;

a second bus interface, for coupling to a CPU memory from which said CPU fetches and executes program instructions and which caches user data for storage on disk drives controlled by the controllers;

at least one control register, programmable by said CPU with window information defining a window of locations within said CPU memory, said window comprising less than an entirety of said CPU memory; and control logic, coupled to said interfaces, wherein said control logic is configured to control said second bus interface to write said data to said CPU memory, but only within said window and nowhere else within said CPU memory, wherein said control logic is configured to refrain from controlling said second bus interface to write said data to said CPU memory outside of said window even if said control logic determines that a portion of said data is destined for said CPU memory within said window.

\* \* \* \* \*